US012739823B2

(12) United States Patent
Kim et al.

(10) Patent No.: US 12,739,823 B2
(45) Date of Patent: Sep. 15, 2026

(54) METHOD FOR TRANSMITTING AND RECEIVING MESSAGE B IN WIRELESS COMMUNICATION SYSTEM AND APPARATUS THEREFOR

(71) Applicant: LG ELECTRONICS INC., Seoul (KR)

(72) Inventors: Jaehyung Kim, Seoul (KR); Hyunsoo Ko, Seoul (KR); Suckchel Yang, Seoul (KR); Youngdae Lee, Seoul (KR); Seunggye Hwang, Seoul (KR); Sunghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 612 days.

(21) Appl. No.: 18/031,528

(22) PCT Filed: Oct. 15, 2021

(86) PCT No.: PCT/KR2021/014371

§ 371 (c)(1),
(2) Date: Apr. 12, 2023

(87) PCT Pub. No.: WO2022/080955

PCT Pub. Date: Apr. 21, 2022

(65) Prior Publication Data

US 2023/0379904 A1 Nov. 23, 2023

(30) Foreign Application Priority Data

Oct. 16, 2020 (KR) ........................ 10-2020-0134319

(51) Int. Cl.
*H04W 72/1268* (2023.01)
*H04W 72/51* (2023.01)
(Continued)

(52) U.S. Cl.
CPC ....... *H04W 72/1268* (2013.01); *H04W 72/51* (2023.01); *H04W 74/04* (2013.01);
(Continued)

(58) Field of Classification Search
CPC . H04W 72/1268; H04W 72/51; H04W 74/04; H04W 74/0833; H04W 74/0836;
(Continued)

(56) References Cited

U.S. PATENT DOCUMENTS

2011/0287776 A1* 11/2011 Vujcic .............. H04W 74/0833 455/452.1
2021/0058971 A1* 2/2021 MolavianJazi ..... H04W 56/001
(Continued)

FOREIGN PATENT DOCUMENTS

KR 10-2010-0091873 A 8/2010

OTHER PUBLICATIONS

"Other aspects for reduced capability devices", Huawei, HiSilicon, 3GPP TSG RAN WG1 Meeting #101-e E-meeting, May 25-Jun. 5, 2020, R1-2004612, 6 pages.
(Continued)

*Primary Examiner* — Kathy W Wang-Hurst
*Assistant Examiner* — Garth D Richmond
(74) *Attorney, Agent, or Firm* — BRYAN CAVE LEIGHTON PAISNER LLP

(57) ABSTRACT

A method for transmitting and receiving a messageB (MSgB) in a wireless communication system and an apparatus therefor are proposed. The method performed by a device comprises the steps of: transmitting an MsgA-preamble to a base station; transmitting an MsgA-PUSCH to the base station; and receiving an MsgB from the base station, on the basis of the MsgA-preamble and the MsgA-
(Continued)

PUSCH, wherein the MsgA-preamble or the MsgA-PUSCH may indicate that the device is a reduced capability (RedCap) device.

15 Claims, 16 Drawing Sheets

(51) Int. Cl.
*H04W 74/04* (2009.01)
*H04W 74/0833* (2024.01)
*H04W 74/0836* (2024.01)
*H04W 74/0838* (2024.01)

(52) U.S. Cl.
CPC ... *H04W 74/0833* (2013.01); *H04W 74/0836* (2024.01); *H04W 74/0838* (2024.01)

(58) Field of Classification Search
CPC ............ H04W 74/0838; H04W 48/12; H04W 74/004; H04W 74/006; H04W 74/0808; H04W 8/24; H04L 1/00; H04L 5/0048
See application file for complete search history.

(56) References Cited

U.S. PATENT DOCUMENTS

2021/0359832 A1* 11/2021 Lei .................... H04W 72/1263
2021/0360660 A1* 11/2021 Cozzo .............. H04W 72/1268
2022/0039072 A1* 2/2022 Babaei .................. H04L 5/0053
2022/0116982 A1* 4/2022 Lee ....................... H04W 72/23
2022/0117004 A1* 4/2022 Lee ....................... H04W 48/14
2022/0346140 A1* 10/2022 Agiwal ................. H04W 76/36
2022/0394781 A1* 12/2022 Lu ..................... H04W 74/0866
2023/0072513 A1* 3/2023 Fang ..................... H04L 5/0053
2023/0188261 A1* 6/2023 Awadin ................. H04L 1/1864
370/329
2023/0209541 A1* 6/2023 He .................... H04W 72/1268
370/329
2023/0354346 A1* 11/2023 Mu ....................... H04W 72/23
2024/0015796 A1* 1/2024 Fehrenbach ...... H04W 74/0833

OTHER PUBLICATIONS

"Summary on [102-e-NR-RedCap-05]", Moderator (Intel Corporation), 3GPP TSG RAN WG1 Meeting #102-E e-Meeting, Aug. 17-28, 2020, R1-2007283, pp. 1-26.

"MsgB-RNTI ambiguity for CFRA and CBRA of 2-Step RACH", Sony, 3GPP TSG-RAN Meeting #109bis-e Electronic, Apr. 20-Apr. 30, 2020, R2-2002668, 4 pages.

"UP Tdoc summary for 2-step RACH", Rapporteur (ZTE), 3GPP TSG-RAN2 Meeting 109b-e Electronic, Apr. 20-Apr. 30, 2020, R2-20yxxxx, 26 pages.

* cited by examiner

【FIG. 1】
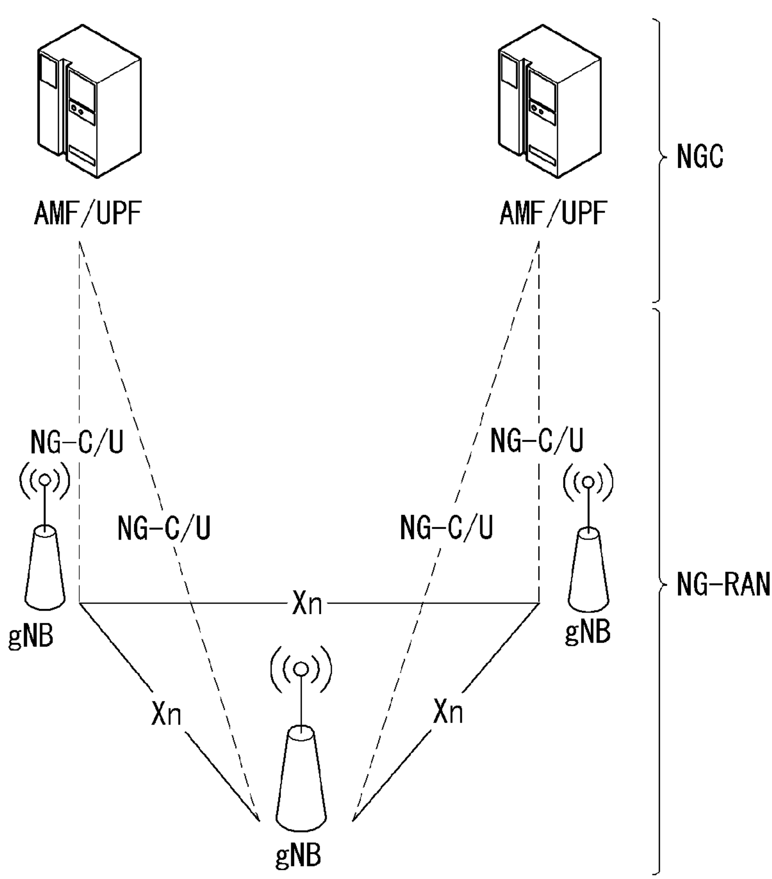
【FIG. 2】
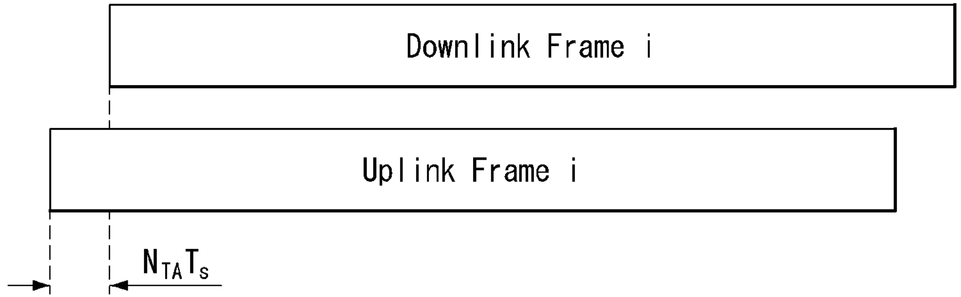

【FIG. 3】
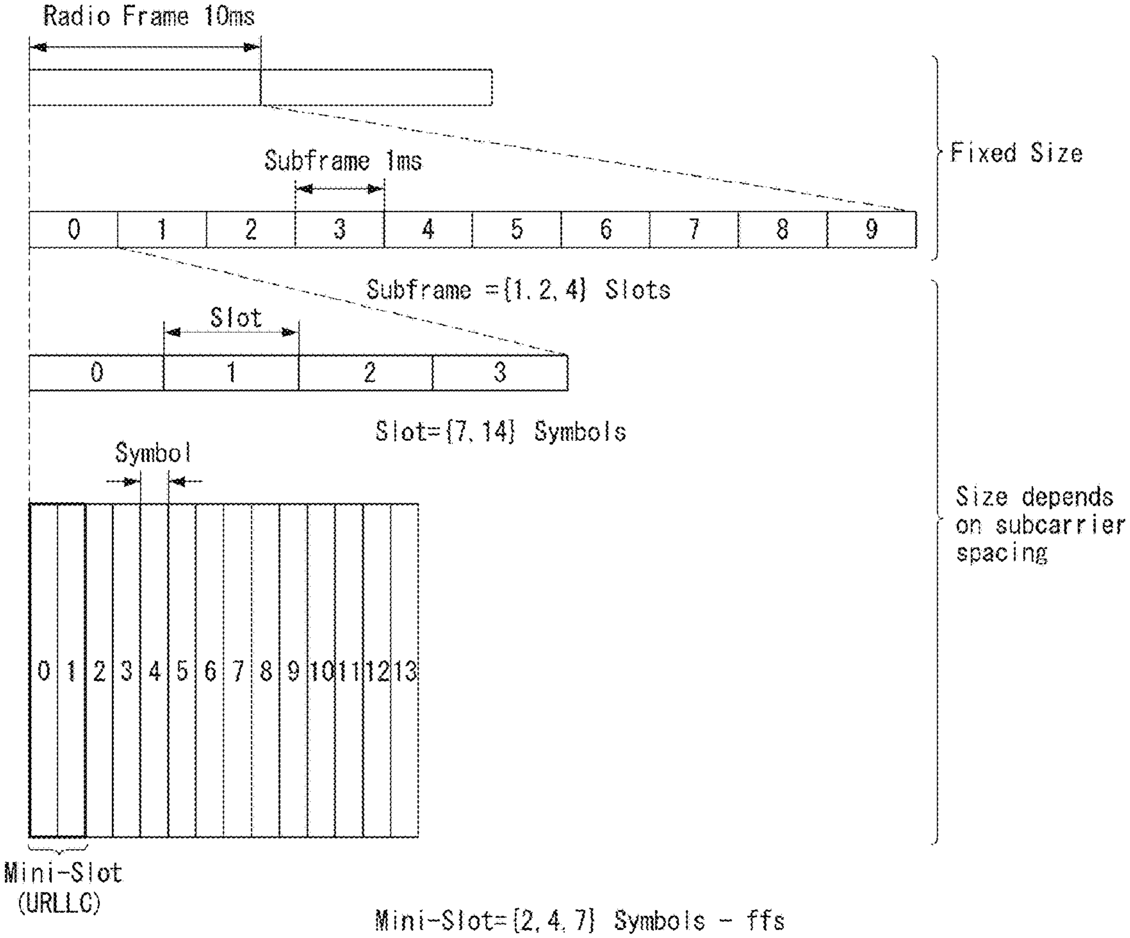

【FIG. 4】
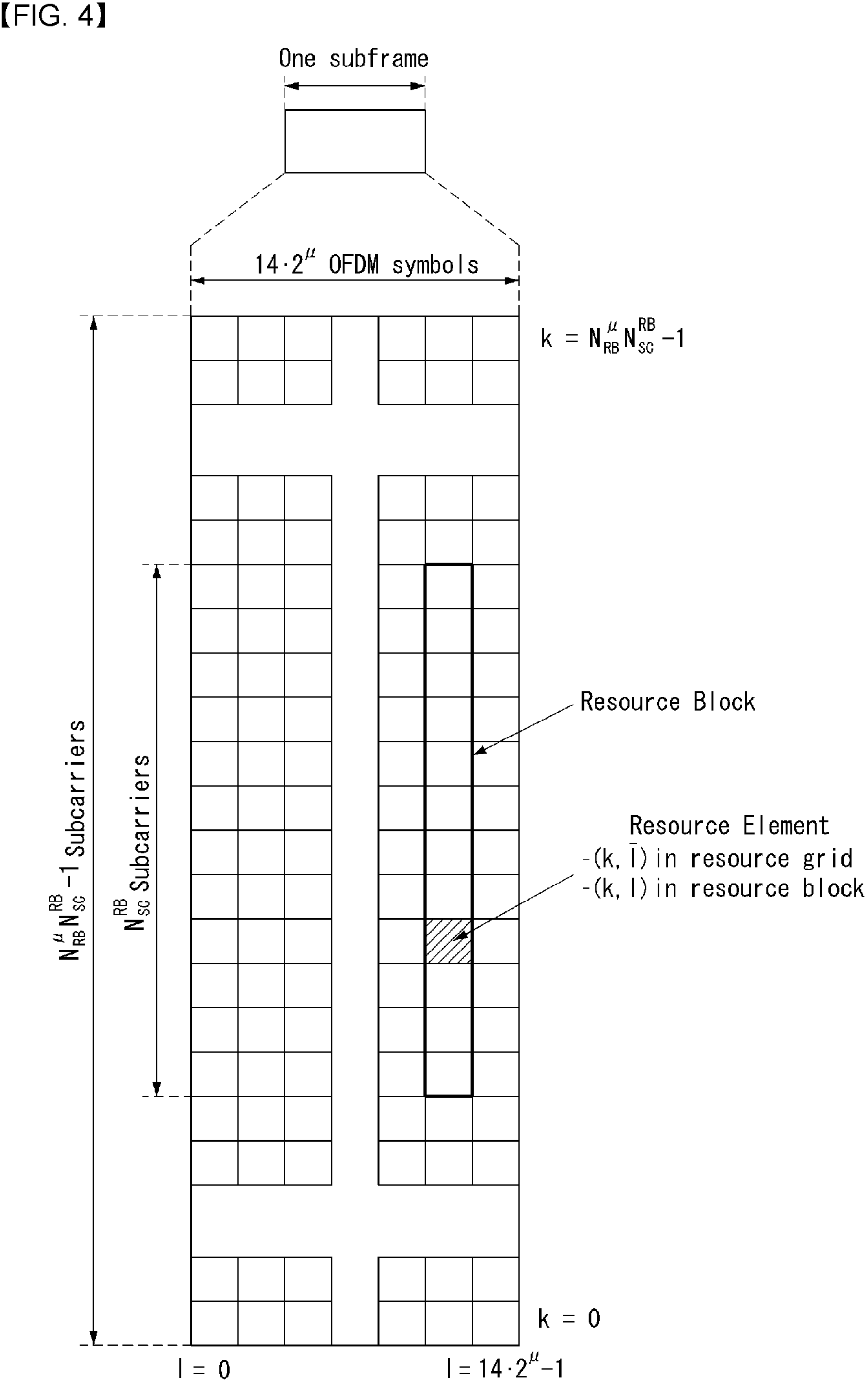

【FIG. 5】
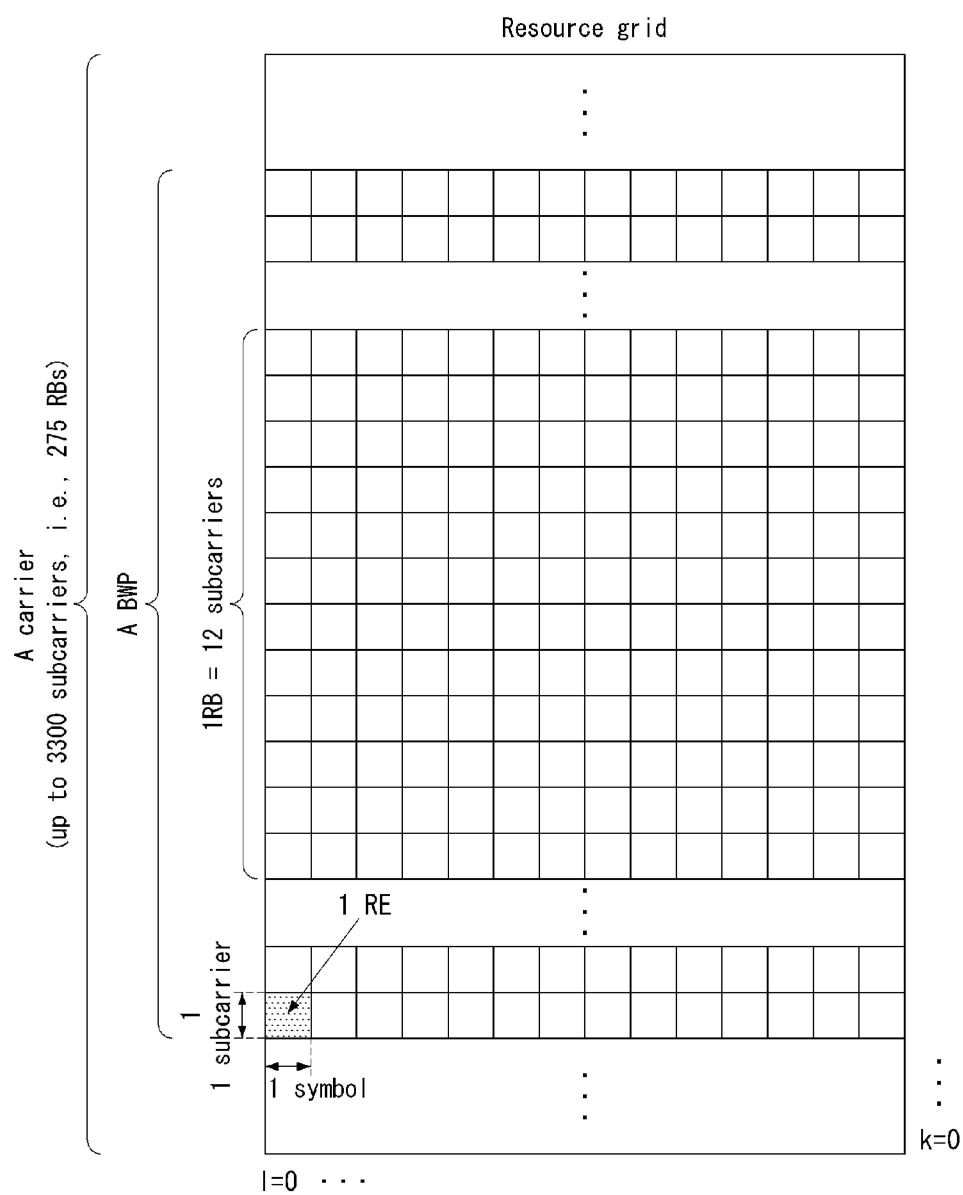

【FIG. 6】
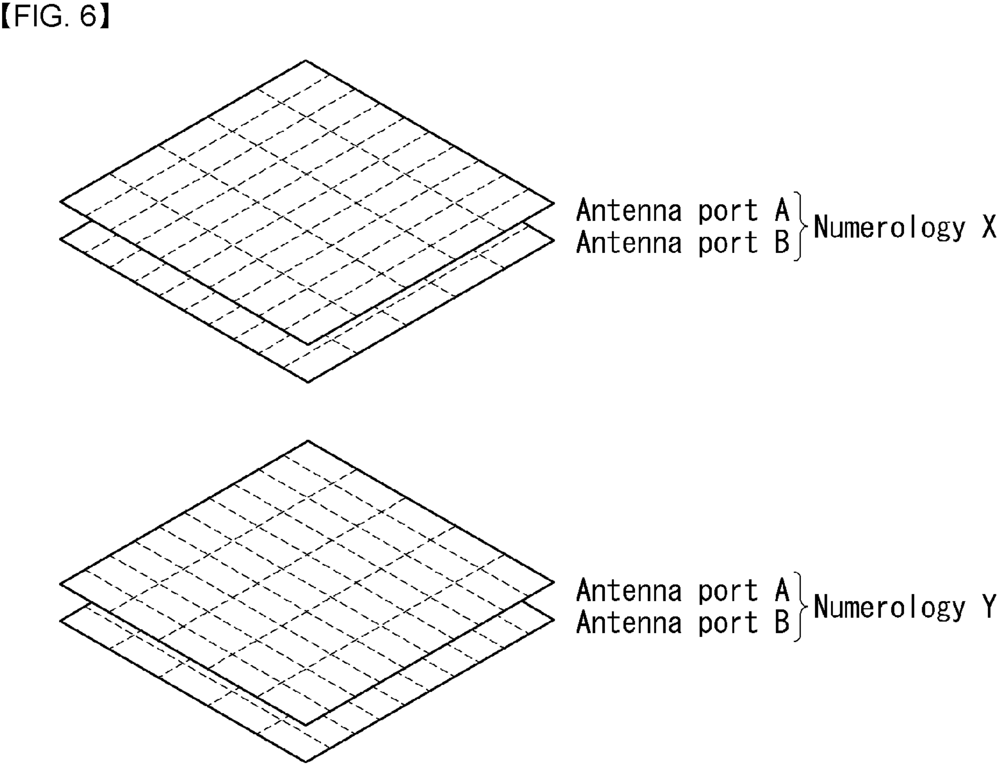

【FIG. 7】
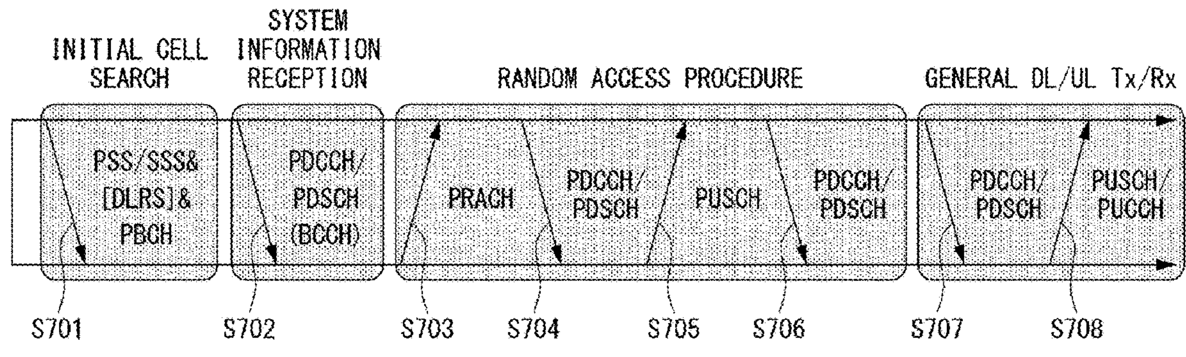

【FIG. 8】
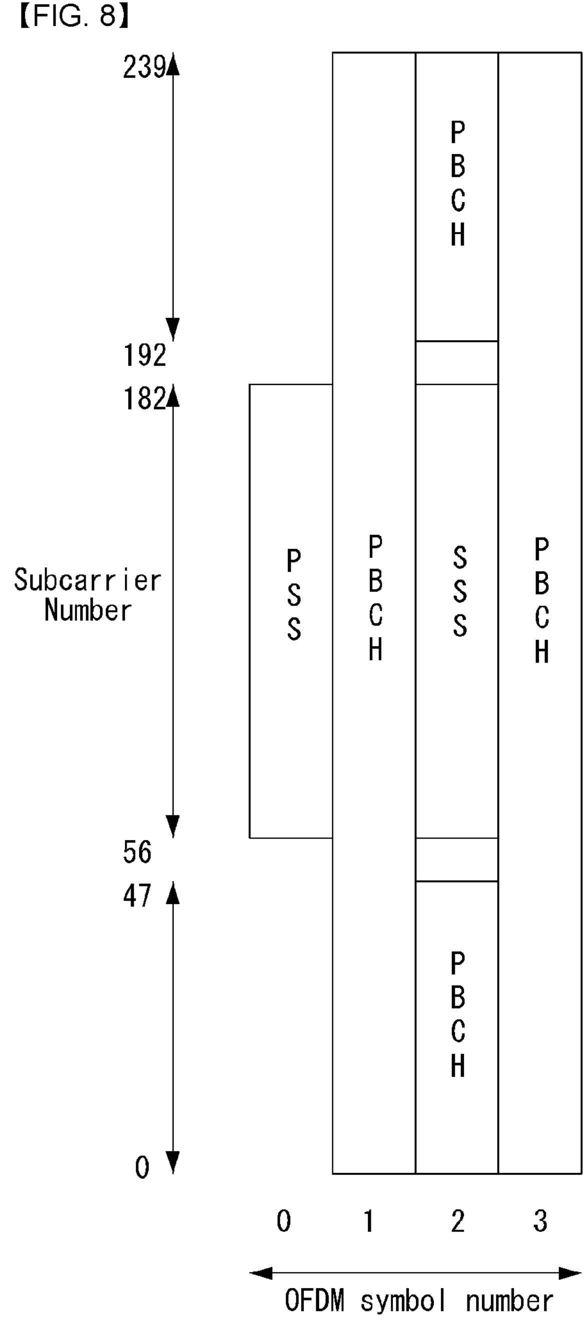

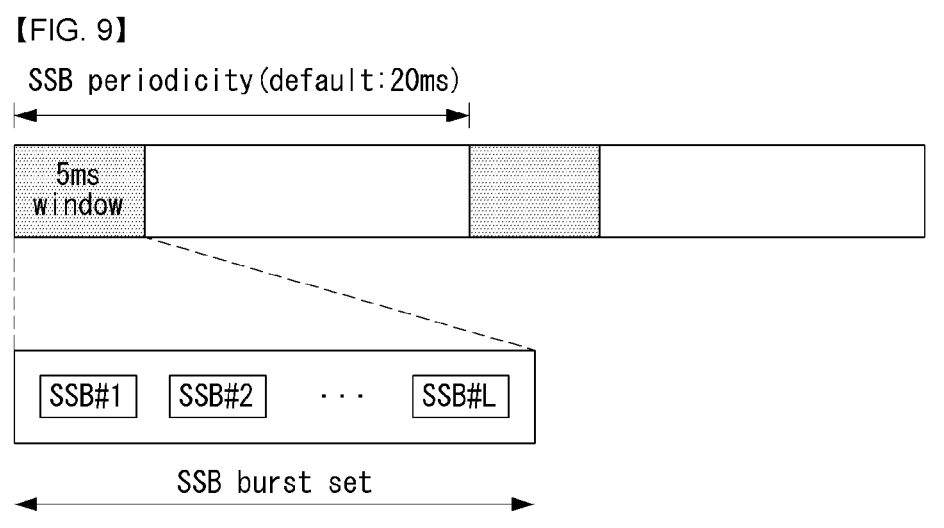

【FIG. 9】

SSB periodicity(default:20ms)

5ms window

SSB#1 SSB#2 ... SSB#L

SSB burst set

【FIG. 10】
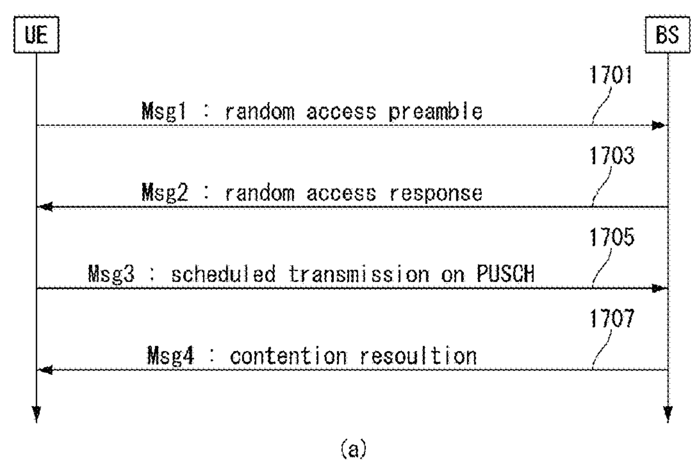
(a)
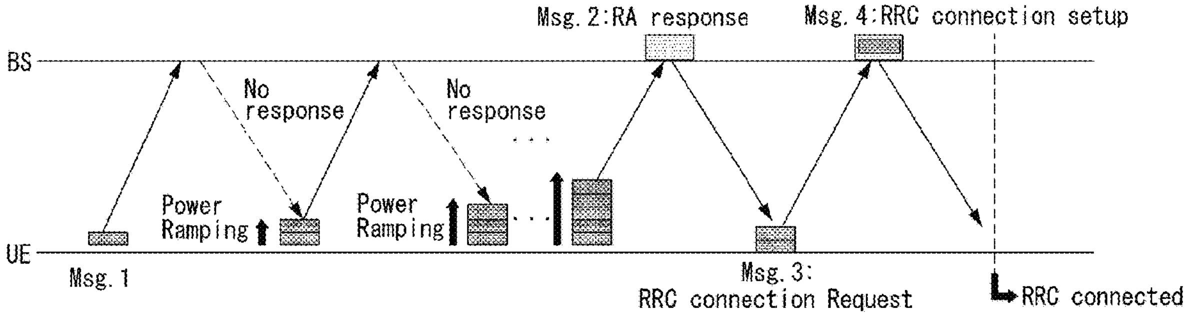
(b)

【FIG. 11】
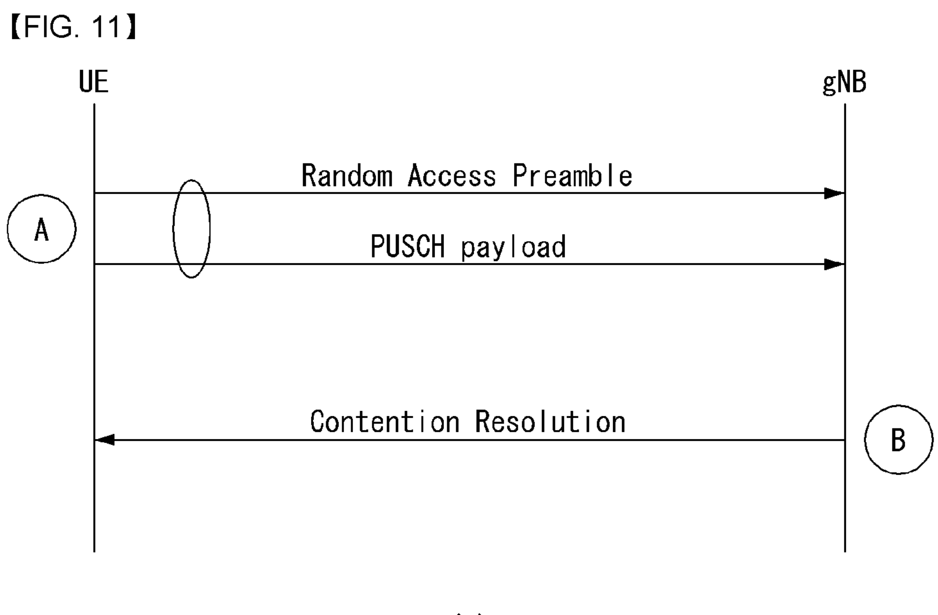
(a)
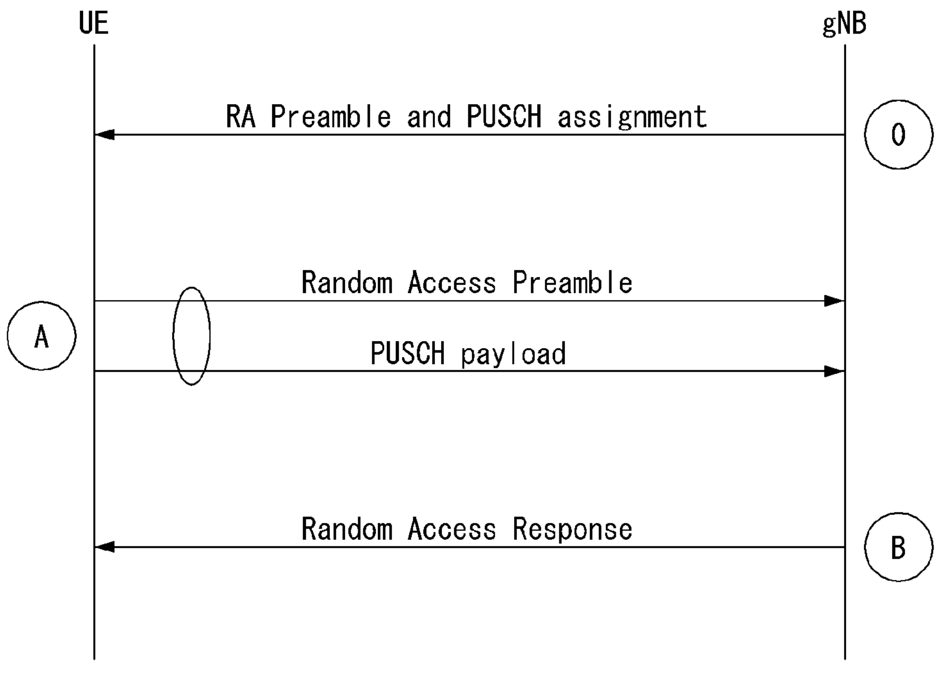
(b)

【FIG. 12】
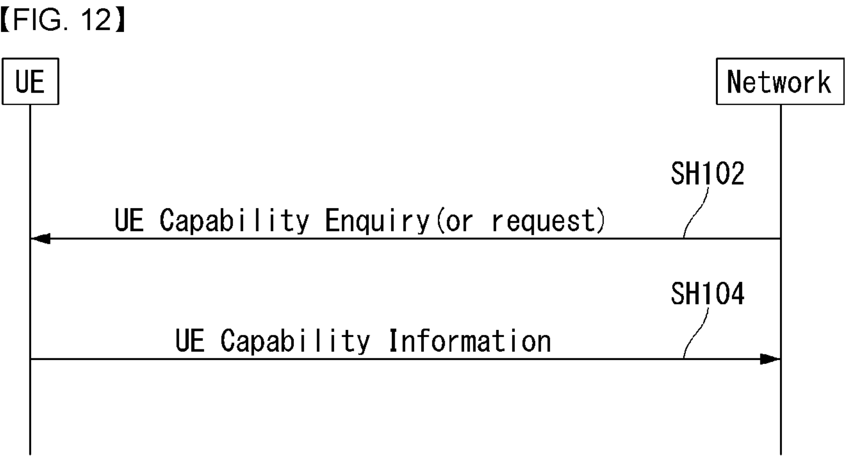

【FIG. 13】
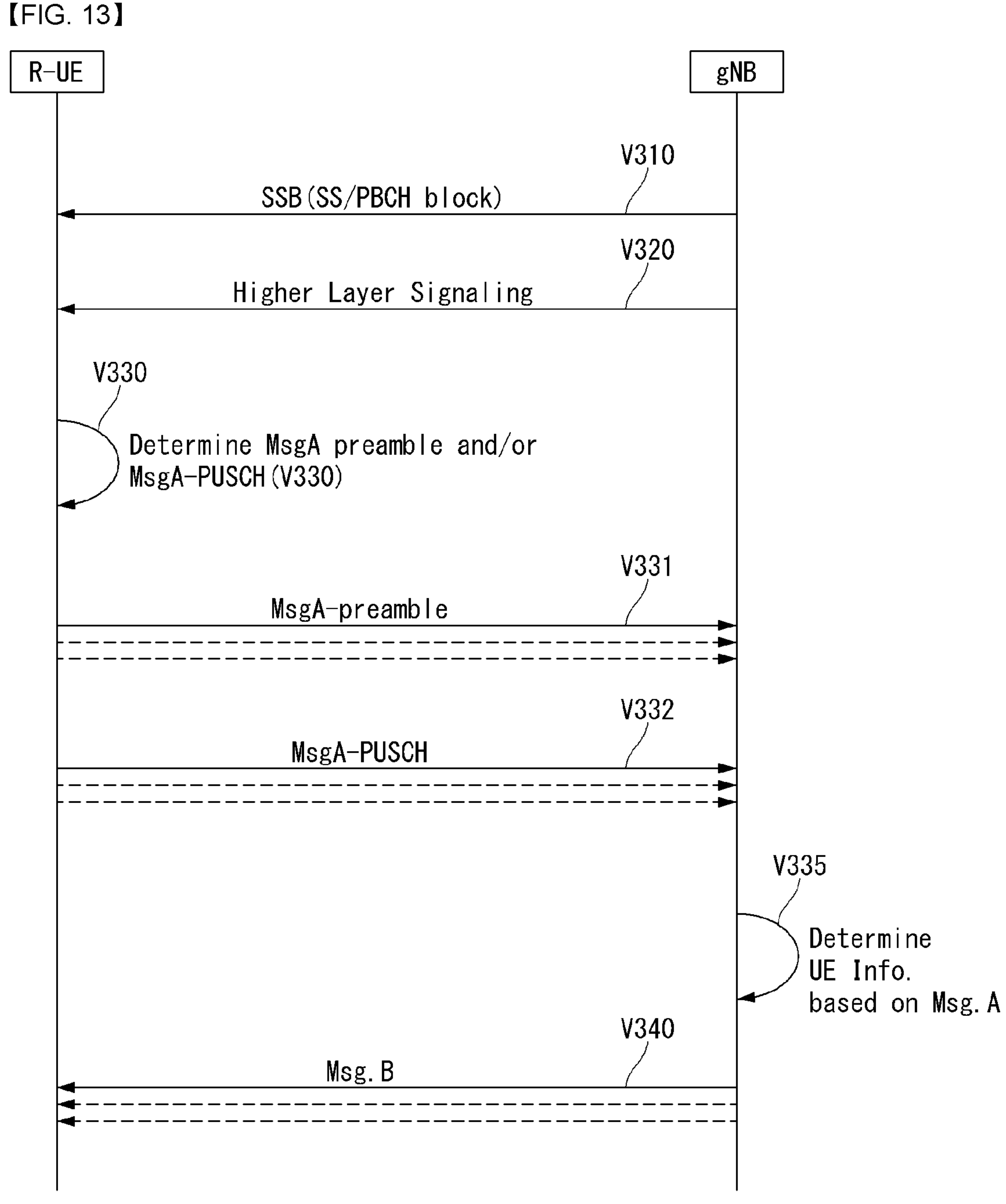

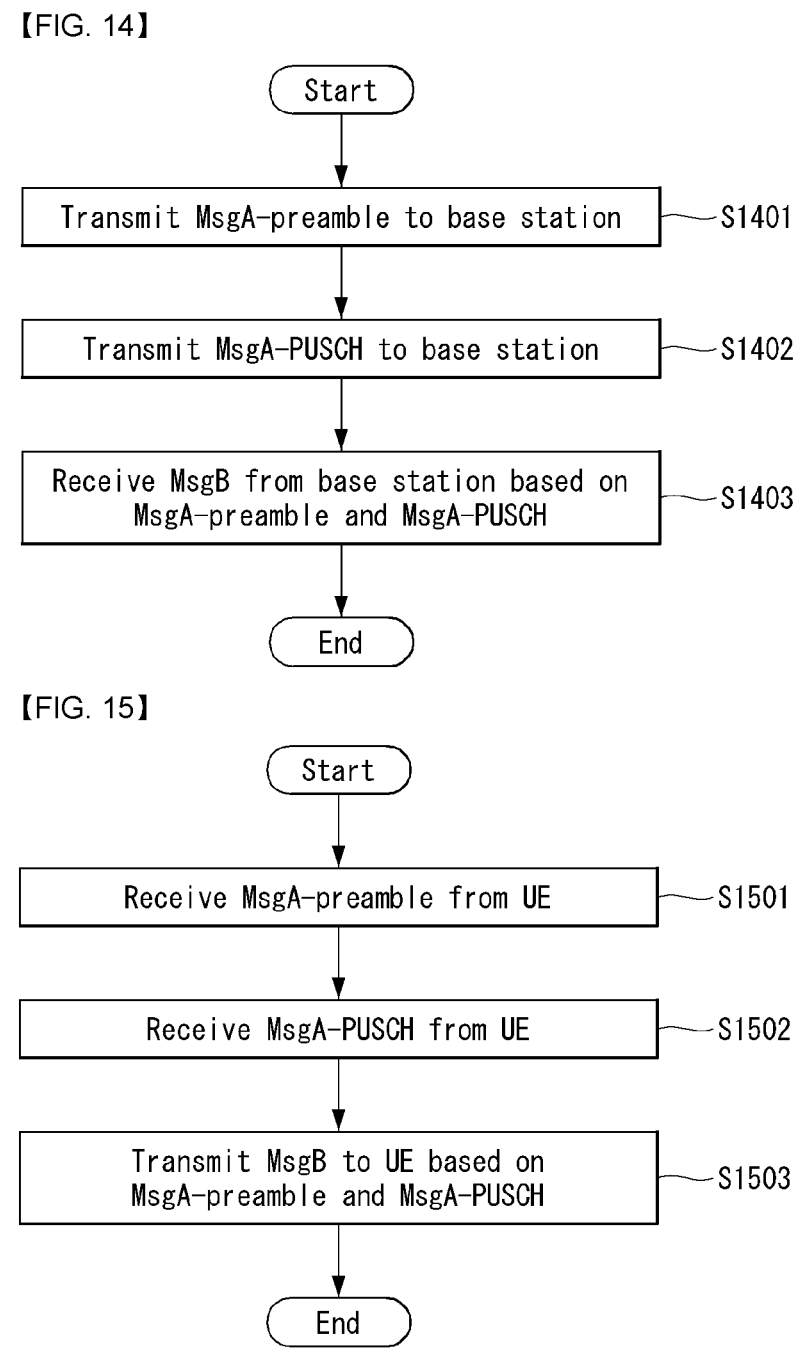

【FIG. 14】

Start

Transmit MsgA-preamble to base station — S1401

Transmit MsgA-PUSCH to base station — S1402

Receive MsgB from base station based on MsgA-preamble and MsgA-PUSCH — S1403

End

【FIG. 15】

Start

Receive MsgA-preamble from UE — S1501

Receive MsgA-PUSCH from UE — S1502

Transmit MsgB to UE based on MsgA-preamble and MsgA-PUSCH — S1503

End

【FIG. 16】
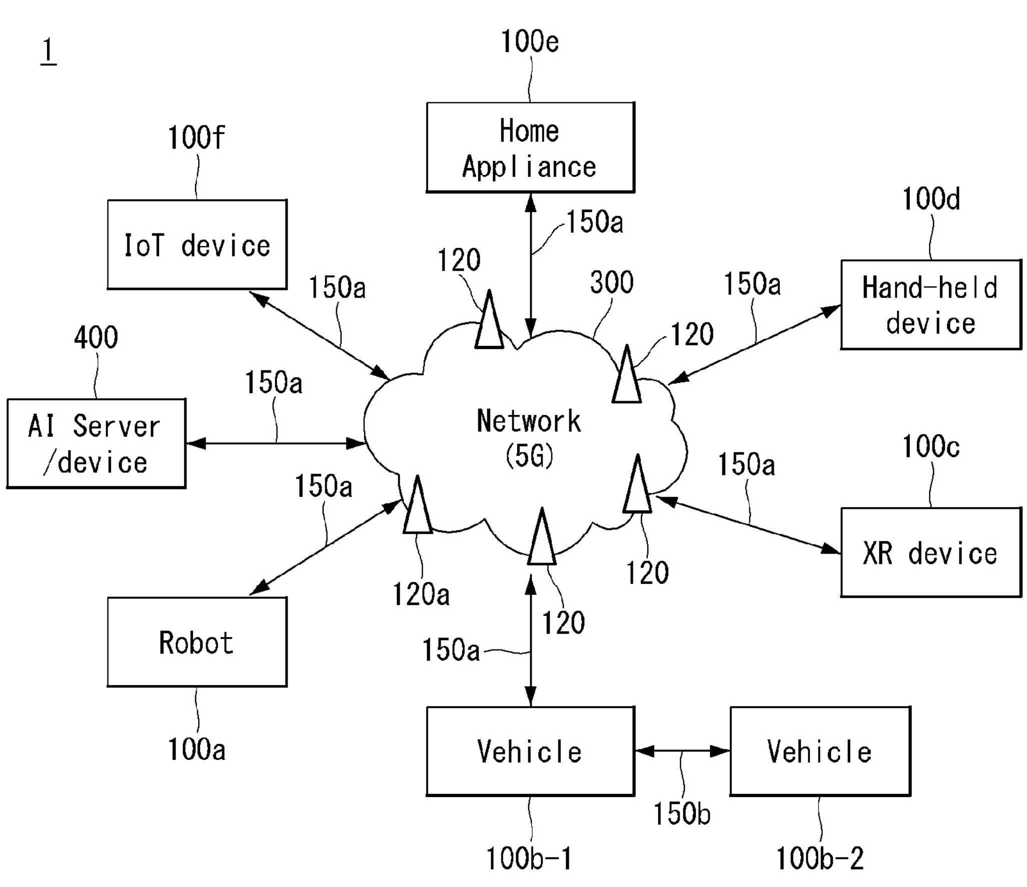
【FIG. 17】
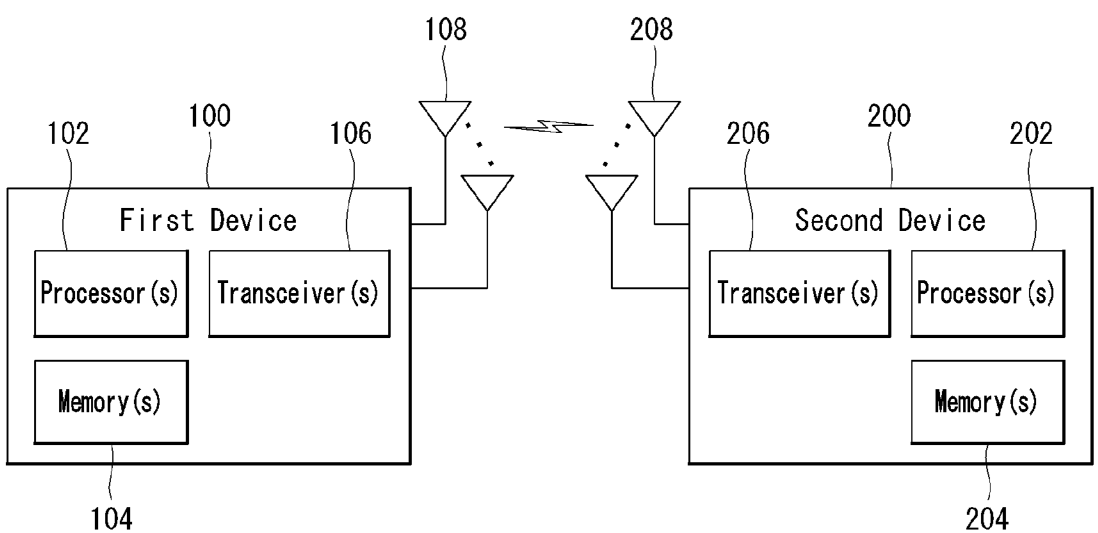

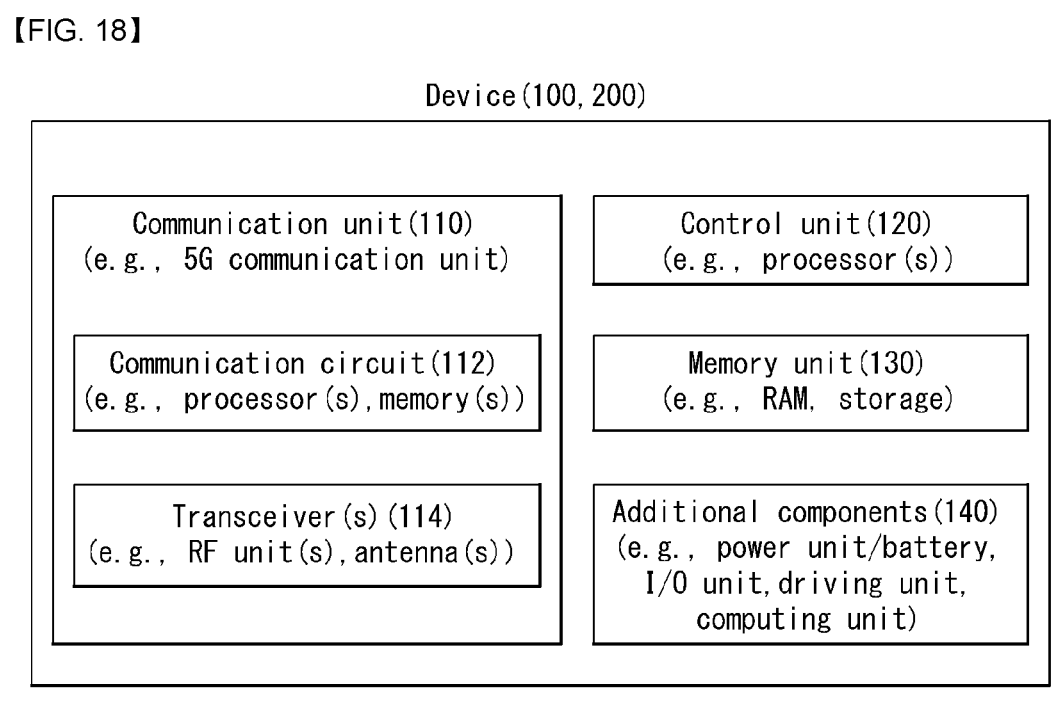

【FIG. 18】

【FIG. 19】
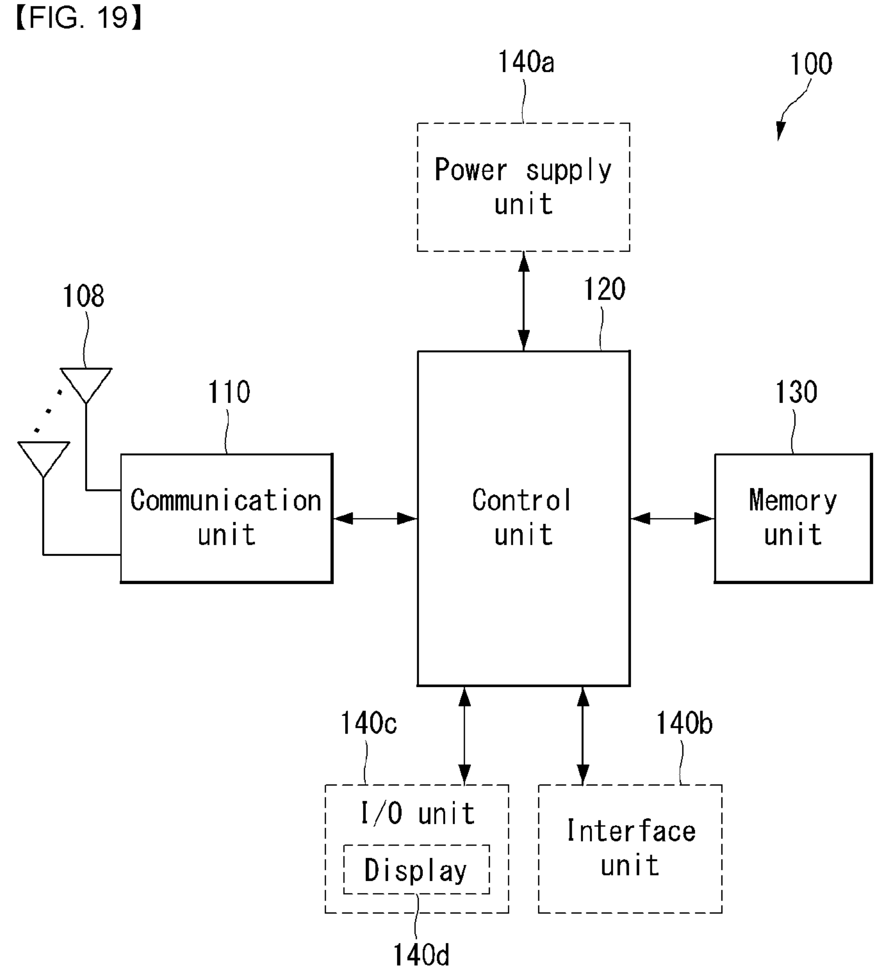

METHOD FOR TRANSMITTING AND RECEIVING MESSAGE B IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2021/014371, filed on Oct. 15, 2021, which claims the benefit of Korean Patent Application No. 10-2020-0134319 filed on Oct. 16, 2020 in the Korean Intellectual Property Office, the contents of which are all hereby incorporated by reference herein in their entirety.

TECHNICAL FIELD

The present disclosure relates to a wireless communication system and, more particularly, to a method for transmitting and receiving a messageB (MsgB) and an apparatus therefor.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for transmitting and receiving, at an early stage, information indicating that a UE is a reduced capability (RedCap) UE in a 2-step random access procedure.

Technical problems to be resolved by the present disclosure are not limited by the above-mentioned technical problems, and other technical problems which are not mentioned above can be clearly understood from the following description by those skilled in the art to which the present disclosure pertains.

Technical Solution

A method for transmitting and receiving a messageB (MSgB) in a wireless communication system and an apparatus therefor are proposed. The method performed by a UE includes: transmitting an MsgA-preamble to a base station; transmitting an MsgA-PUSCH to the base station; and receiving an MsgB from the base station, on the basis of the MsgA-preamble and the MsgA-PUSCH, wherein the MsgA-preamble or the MsgA-PUSCH may indicate that the UE is a reduced capability (RedCap) UE.

Furthermore, in the method of the present disclosure, N preambles among contention free random access (CFRA) preambles of normal UE, which are contiguous to a contention based random access (CBRA) preamble of the normal UE, may be allocated for the RedCap UE, based on there being no random access channel occasion (RO) configured for the RedCap UE.

Furthermore, in the method of the present disclosure, the MsgA-preamble may be one of the N preambles.

Furthermore, in the method of the present disclosure, information on the N may be configured based on higher layer signaling or system information.

Furthermore, in the method of the present disclosure, preambles corresponding to an RO for a 2-step random access (RA) of the normal UE may be used for the RedCap UE, based on there being no random access channel occasion (RO) configured for the RedCap UE and there being the RO configured for the 2-step random access (RA) of the normal UE.

Furthermore, in the method of the present disclosure, the MsgA-preamble may be one of the preambles corresponding to the RO for the 2-step RA of the normal UE.

Furthermore, in the method of the present disclosure, the preambles corresponding to the RO of the normal UE may be used for the RedCap UE, based on there being a random access channel occasion (RO) configured for a 4-step random access (RA) of the RedCap UE and there being no RO configured for the 2-step RA of the RedCap UE.

Furthermore, in the method of the present disclosure, the MsgA-preamble may be one of the preambles corresponding to the RO of the normal UE.

Furthermore, in the method of the present disclosure, resources of the MsgA-PUSCH may be determined based on the MsgA-preamble.

Furthermore, in the method of the present disclosure, the RedCap UE and the normal UE may share some of MsgA-PUSCH resources, and unshared MsgA-PUSCH resources may be determined based on a mask index.

Furthermore, in the method of the present disclosure, the MsgA-PUSCH may include information indicating that the UE is the RedCap UE.

Furthermore, in the method of the present disclosure, the UE may be indicated to be the RedCap UE by the MsgA-preamble, based on there being MsgA-preambles configured for the RedCap UE or based on there being the MsgA-preambles configured for the RedCap UE and MsgA-PUSCH resources configured for the RedCap UE, and the UE may be indicated to be the RedCap UE by the MsgA-PUSCH, based on there being no MsgA-preambles configured for the RedCap UE and there being the MsgA-PUSCH resources configured for the RedCap UE.

Furthermore, in the method of the present disclosure, the MsgB may be scheduled based on downlink control information (DCI) with a CRC (cyclic redundancy check) scrambled by an MsgB-R (reduced)-RNTI (radio network temporary identifier).

Furthermore, a UE configured to receive a messageB (MsgB) in a wireless communication system in the present disclosure may include: at least one transceiver; at least one processor; and at least one memory operably connected to the at least one processor and storing instructions that, when executed by the at least one processor, perform operations. The operations may include: transmitting an MsgA-preamble to a base station; transmitting an MsgA-physical uplink shared channel (PUSCH) to the base station; and receiving the MsgB from the base station based on the MsgA-preamble and the MsgA-PUSCH, wherein the MsgA-preamble or the MsgA-PUSCH may indicate that the UE is a reduced capability (RedCap) UE.

Furthermore, in the UE of the present disclosure, N preambles among contention free random access (CFRA) preambles of normal UE, which are contiguous to a contention based random access (CBRA) preamble of the normal UE, may be allocated for the RedCap UE, based on there being no random access channel occasion (RO) configured for the RedCap UE.

Furthermore, in the UE of the present disclosure, the MsgA-preamble may be one of the N preambles.

Furthermore, the present disclosure proposes a method for transmitting a messageB (MsgB) in a wireless communication system and an apparatus therefor. The method performed by a base station includes: receiving an MsgA-preamble from a UE; receiving an MsgA-physical uplink shared channel (PUSCH) from the UE; and transmitting the MsgB to the UE based on the MsgA-preamble and the MsgA-PUSCH, wherein the MsgA-preamble or the MsgA-PUSCH may indicate that the UE is a reduced capability (RedCap) UE.

Furthermore, a base station configured to transmit a messageB (MsgB) in a wireless communication system in the present disclosure may include: at least one transceiver; at least one processor; and at least one memory operably connected to the at least one processor and storing instructions that, when executed by the at least one processor, perform operations. The operations may include: receiving an MsgA-preamble from a UE; receiving an MsgA-physical uplink shared channel (PUSCH) from the UE; and transmitting the MsgB to the UE based on the MsgA-preamble and the MsgA-PUSCH, wherein the MsgA-preamble or the MsgA-PUSCH may indicate that the UE is a reduced capability (RedCap) UE.

Furthermore, a processing apparatus configured to control a UE so as to receive a messageB (MsgB) in a wireless communication system in the present disclosure may include: at least one transceiver; at least one processor; and at least one memory operably connected to the at least one processor and storing instructions that, based on being executed by the at least one processor, perform operations. The operations may include: transmitting an MsgA-preamble to a base station; transmitting an MsgA-physical uplink shared channel (PUSCH) to the base station; and receiving the MsgB from the base station based on the MsgA-preamble and the MsgA-PUSCH, wherein the MsgA-preamble or the MsgA-PUSCH may indicate that the UE is a reduced capability (RedCap) UE.

Furthermore, in a computer-readable storage medium storing at least one instruction that, when executed by at least one processor, enables the at least one processor to control operations, the operations may include: transmitting a message (MsgA)-preamble to a base station; transmitting an MsgA-physical uplink shared channel (PUSCH) to the base station; and receiving the MsgB from the base station based on the MsgA-preamble and the MsgA-PUSCH, wherein the MsgA-preamble or the MsgA-PUSCH may indicate that the UE is a reduced capability (RedCap) UE.

Advantageous Effects

According to the present disclosure, communication reliability can be improved by transmitting and receiving, at an early stage, information indicating that a UE is a RedCap UE in a 2-step random access procedure.

According to the present disclosure, resource efficiency can be enhanced in a communication environment where a normal UE (e.g., a UE other than the RedCap UE) and the RedCap UE coexist, and a communication system with low latency and high reliability can be achieved.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates a slot structure of an NR frame to which a method described in the present disclosure is applicable.

FIG. 6 illustrates examples of a resource grid per antenna port and numerology to which a method described in the present disclosure is applicable.

FIG. 7 illustrates physical channels and general signal transmission used in a 3GPP system.

FIG. 8 illustrates an SSB structure.

FIG. 9 illustrates SSB transmission.

FIG. 10(*a*) and FIG. 10(*b*) illustrate an example of a random access procedure.

FIGS. 11(*a*) and 11(*b*) illustrate a 2-step RACH procedure.

FIG. 12 illustrates a flow chart of a procedure of reporting device type information to a base station.

FIG. 13 illustrates an example of a 2-step RACH process of redcap UE (R-UE).

FIG. 14 is a flow chart illustrating an operation method of a UE described in the present disclosure.

FIG. 15 is a flow chart illustrating an operation method of a base station described in the present disclosure.

FIG. 16 illustrates a communication system (1) applied to the disclosure.

FIG. 17 illustrates a wireless device which may be applied to the disclosure.

FIG. 18 illustrates another example of a wireless device applied to the disclosure.

FIG. 19 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (VVT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE 36.211: Physical channels and modulation
36.212: Multiplexing and channel coding
36.213: Physical layer procedures
36.300: Overall description
36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In addition, use cases for regions spanning mMTC and eMBB, or mMTC and URLLC, are considered important.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$[kHz] | Cyclic prefix |
|---|---|---|
| 0 | 15 | Normal |
| 1 | 30 | Normal |

TABLE 1-continued

| μ | $\Delta f = 2^\mu \cdot 15$[kHz] | Cyclic prefix |
|---|---|---|
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \{0, \ldots, N_{subframe}^{slots,\mu} - 1\}$$

within a subframe and are numbered in increasing order of $$n_{s,f}^\mu \in \{0, \ldots, N_{frame}^{slots,\mu} - 1\}$$

within a radio frame. One slot consists of consecutive OFDM symbols of $$N_{symb}^\mu, \text{ and } N_{symb}^\mu$$

is determined depending on a numerology used and slot configuration. The start of slots $$n_s^{\mu}$$

in a subframe is aligned in time with the start of OFDM symbols $$n_s^{\mu} N_{symb}^{\mu}$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $$N_{PB}^{\mu} N_{sc}^{RB}$$

subcarriers on a frequency domain, each subframe consisting of 14·2μ OFDM symbols, but the disclosure is not limited thereto.

In the NR system, a transmitted signal is described by one or more resource grids, consisting of $$N_{PB}^{\mu} N_{sc}^{RB}$$

subcarriers, and $$2^{\mu} N_{symb}^{(\mu)}$$

OFDM symbols, where $$N_{PB}^{\mu} \leq N_{RB}^{max,\mu} \cdot N_{RB}^{max,\mu}$$

denotes a maximum transmission bandwidth and may change not only between numerologies but also between uplink and downlink.

In this case, as illustrated in FIG. 6, one resource grid may be configured per numerology μ and antenna port p.

FIG. 5 illustrates a slot structure of an NR frame to which a method described in the present disclosure is applicable.

A slot includes a plurality of symbols in a time domain. For example, in a normal CP, one slot includes 7 symbols, and in an extended CP, one slot includes 6 symbols. A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) RBs ((P)RBs) in the frequency domain, and the BWP may correspond to one numerology (e.g., SCS, CP length, etc.). A carrier may include up to N BWPs (e.g., 5 BWPs). Data communication may be performed via an activated BWP, and only one BWP may be activated for one UE. Each element in a resource grid may be referred to as a resource element (RE), and one complex symbol may be mapped to each element.

FIG. 6 illustrates examples of a resource grid per antenna port and numerology to which a method described in the present disclosure is applicable.

Each element of the resource grid for the numerology μ and the antenna port p is called a resource element and is uniquely identified by an index pair (k,$\bar{l}$), where $$k = 0, \ldots, N_{PB}^{\mu} N_{sc}^{RB} - 1$$

is an index on a frequency domain, and $$\bar{l} = 0, \ldots, 2^{\mu} N_{symb}^{(\mu)} - 1$$

refers to a location of a symbol in a subframe. The index pair (k,l) is used to refer to a resource element in a slot, where $$l = 0, \ldots, N_{symb}^{\mu} - 1.$$

The resource element (k,$\bar{l}$) for the numerology μ and the antenna port p corresponds to a complex value $$a_{k,\bar{l}}^{(p,\mu)}.$$

When there is no risk for confusion or when a specific antenna port or numerology is not specified, the indices p and μ may be dropped, and as a result, the complex value may be $$a_{k,\bar{l}}^{(p)}$$

or $a_{k,\bar{l}}$.

Further, a physical resource block is defined as $$N_{sc}^{RB} = 12$$

consecutive subcarriers in the frequency domain.

Point A serves as a common reference point of a resource block grid and may be obtained as follows.

- offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2,
- absoluteFrequencyPointA represents frequency-location of the point A expressed as in absolute radio-frequency channel number (ARFCN), The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $$n_{CRB}^{\mu}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to size $$N_{BWP,i}^{size} - 1,$$

where i is No. Of the BWP. A relation between the physical resource block $n_{PRB}$ in BWP/and the common resource block $n_{CRB}$ may be given by the following Equation 2.

$$n_{CRB} = n_{PRB} + N_{BWP,i}^{start} \quad \text{[Equation 2]}$$

Here, $$N_{BWP,i}^{start}$$

may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 7 illustrates physical channels and general signal transmission used in 3GPP systems. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Initial Access (IA) and Random Access (RA) Procedures

Synchronization Signal Block (SSB) Transmission and Related Operation

FIG. 8 illustrates an SSB structure. The UE may perform cell search, system information acquisition, beam alignment for initial access, DL measurement, and the like based on an SSB. The SSB is interchangeably used with a synchronization signal/physical broadcast channel (SS/PBCH) block.

Referring to FIG. 8, the SSB includes a PSS, an SSS and a PBCH. The SSB consists of four consecutive OFDM symbols, and the PSS, the PBCH, the SSS/PBCH or the PBCH is transmitted per OFDM symbol. Each of the PSS and the SSS consists of one OFDM symbol and 127 subcarriers, and the PBCH consists of 3 OFDM symbols and 576 subcarriers. The PBCH is encoded/decoded based on a polar code and is modulated/demodulated according to quadrature phase shift keying (QPSK). The PBCH in the OFDM symbol includes data resource elements (REs), to which a complex modulation value of the PBCH is mapped, and DMRS REs, to which a demodulation reference signal (DMRS) for the PBCH is mapped. There are three DMRS REs per resource block of the OFDM symbol, and there are three data REs between the DMRS REs.

Cell Search

The cell search refers to a procedure in which a UE acquires time/frequency synchronization of a cell and detects a cell identifier (ID) (e.g., physical layer cell ID (PCI)) of the cell. The PSS is used to detect a cell ID from a cell ID group, and the SSS is used to detect a cell ID group. The PBCH is used to detect an SSB (time) index and a half-frame.

The cell search procedure of the UE may be summarized as shown in Table 5 below.

TABLE 5

| | Type of Signals | Operations |
|---|---|---|
| 1st step | PSS | SS/PBCH block (SSB) symbol timing acquisition<br>Cell ID detection within a cell ID group (3 hypothesis) |
| 2nd Step | SSS | Cell ID group detection (336 hypothesis) |
| 3rd Step | PBCH DMRS | SSB index and Half frame (HF) index<br>(Slot and frame boundary detection) |
| 4th Step | PBCH | Time information (80 ms, System Frame Number (SFN), SSB index, HF)<br>Remaining Minimum System Information (RMSI) Control resource set (CORESET)/Search space configuration |
| 5th Step | PDCCH and PDSCH | Cell access information<br>RACH configuration |

There are 336 cell ID groups, and there are 3 cell IDs per cell ID group. A total of 1008 cell IDs are present. Information on a cell ID group to which a cell ID of a cell belongs is provided/acquired via the SSS of the cell, and information on the cell ID among 336 cells in the cell ID is provided/acquired via the PSS. FIG. 9 illustrates SSB transmission.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at a beginning part of the SSB periodicity. The SSB burst set includes a 5 ms time window (i.e., half-frame), and the SSB may be transmitted up to N times within the SS burst set. The maximum transmission number L of the SSB may be given as follows according to a frequency band of a carrier. One slot includes up to two SSBs.

For frequency range up to 3 GHz, L=4

For frequency range from 3 GHz to 6 GHz, L=8

For frequency range from 6 GHz to 52.6 GHz, L=64

A time position of an SSB candidate in the SS burst set may be defined based on a subscriber spacing. The time position of the SSB candidate is indexed from 0 to L−1 (SSB index) in time order within the SSB burst set (i.e., half-frame).

A plurality of SSBs may be transmitted within a frequency span of a carrier. Physical layer cell identifiers of these SSBs need not be unique, and other SSBs may have other physical layer cell identifiers.

The UE may acquire DL synchronization by detecting the SSB. The UE can identify a structure of the SSB burst set based on the detected SSB (time) index, and thus can detect a symbol/slot/half-frame boundary. The number of the frame/half-frame to which the detected SSB belongs may be identified using system frame number (SFN) information and half-frame indication information.

Specifically, the UE may acquire a 10-bit SFN for a frame to which PBCH belongs from the PBCH. Next, the UE may acquire 1-bit half-frame indication information. For example, if the UE detects a PBCH with a half-frame indication bit set to 0, the UE may determine that the SSB, to which the PBCH belongs, belongs to a first half-frame in the frame, and if the UE detects a PBCH with a half-frame indication bit set to 1, the UE may determine that the SSB, to which the PBCH belongs, belongs to a second half-frame in the frame. Finally, the UE may acquire an SSB index of the SSB, to which the PBCH belongs, based on a DMRS sequence and a PBCH payload carried by the PBCH.

System Information Acquisition

System information (SI) is divided into a master information block (MIB) and a plurality of system information blocks (SIB). The SI other than the MIB may be referred to as remaining minimum system information (RMSI). The following may be referred to for details.

The MIB includes information/parameters for monitoring PDCCH scheduling PDSCH carrying system information block1 (SIB1) and is transmitted by a BS via PBCH of SSB. For example, a UE may check whether a control resource set (CORESET) for a Type0-PDCCH common search space exists based on the MIB. The Type0-PDCCH common search space is a kind of PDCCH search space and is used to transmit a PDCCH for scheduling an SI message. If there is a Type0-PDCCH common search space, the UE may determine, based on information (e.g., pdcch-ConfigSIB1)) within the MIB, (i) a plurality of contiguous resource blocks and one or more consecutive symbols constituting the CORESET, and (ii) a PDCCH occasion (e.g., time domain location for PDCCH reception). If there is no Type0-PDCCH common search space, pdcch-ConfigSIB1 provides information for a frequency location where SSB/SIB1 exists and a frequency range where the SSB/SIB1 does not exist.

The SIB1 contains information related to availability and scheduling (e.g., transmission periodicity, SI-window size) of the remaining SIBs (hereinafter, referred to as SIBx, where x is an integer of 2 or more). For example, the SIB1 may inform whether the SIBx is periodically broadcasted or whether the SIBx is provided by a request of the UE according to an on-demand scheme. If the SIBx is provided by the on-demand scheme, the SIB1 may include information which the UE requires to perform an SI request. The SIB1 is transmitted via the PDSCH, the PDCCH for scheduling the SIB1 is transmitted through the Type0-PDCCH common search space, and the SIB1 is transmitted via the PDSCH indicated by the PDCCH.

The SIBx is included in the SI message and is transmitted via the PDSCH. Each SI message is sent within a time window (i.e., SI-window) which periodically occurs.

Channel Measurement and Rate-Matching

Up to L SSBs may be transmitted within an SSB burst set, and the number/location of SSBs which are actually transmitted may vary per BS/cell. The number/location of SSBs which are actually transmitted is used for rate-matching and measurement, and information on the actually transmitted SSBs is provided to a UE.

Random Access Procedure

A random access procedure of a UE may be summarized as shown in Table 6 and FIG. 10.

TABLE 6

| | Type of Signals | Operations/Information obtained |
|---|---|---|
| 1$^{st}$ step | PRACH preamble in UL | Initial beam obtainment<br>Random selection of RA-preamble ID |
| 2$^{nd}$ step | Random Access Response on DL-SCH | Timing Advanced information<br>RA-preamble ID<br>Initial UL grant, Temporary C-RNTI |
| 3$^{rd}$ step | UL transmission on UL-SCH | RRC connection request<br>UE identifier |
| 4$^{th}$ step | Contention Resolution on DL | Temporary C-RNTI on PDCCH for initial access<br>C-RNTI on PDCCH for UE in RRC_CONNECTED |

The random access procedure is used for various purposes. For example, the random access procedure may be used for network initial access, handover, and UE-triggered UL data transmission. The UE may acquire UL synchronization and UL transmission resources through the random access procedure. The random access procedure is classified into a contention-based random access procedure and a contention-free random access procedure.

FIG. 10 illustrates an example of a random access procedure. In particular, FIG. 10 illustrates a contention-based random access procedure.

First, a UE may transmit a random access preamble on a PRACH as Msg1 of a random access procedure in UL (e.g., see 1701 in (a) of FIG. 10).

Random access preamble sequences having different two lengths are supported. Long sequence length 839 is applied to subcarrier spacings of 1.25 kHz and 5 kHz, and short sequence length 139 is applied to subcarrier spacings of 15 kHz, 30 kHz, 60 kHz and 120 kHz.

Multiple preamble formats are defined by one or more RACH OFDM symbols and different cyclic prefixes (and/or guard time). RACH configuration for a cell is included in system information of the cell and is provided to the UE. The RACH configuration includes information on a subcarrier spacing of PRACH, available preambles, preamble format, and the like. The RACH configuration includes association information between SSBs and RACH (time-frequency) resources. The UE transmits a random access preamble in the RACH time-frequency resource associated with the detected or selected SSB.

A threshold of the SSB for the RACH resource association may be set by the network, and an RACH preamble is transmitted or retransmitted based on the SSB in which reference signal received power (RSRP) measured based on the SSB satisfies the threshold. For example, the UE may select one of the SSB(s) satisfying the threshold and may transmit or retransmit the RACH preamble based on the RACH resource associated with the selected SSB.

When a BS receives the random access preamble from the UE, the BS transmits a random access response (RAR) message (Msg2) to the UE (e.g., see 1703 in (a) of FIG. 10). A PDCCH that schedules a PDSCH carrying a RAR is CRC masked with a random access (RA) radio network temporary identifier (RNTI) (RA-RNTI) and is transmitted. The UE that detects the PDCCH masked with the RA-RNTI may receive a RAR from the PDSCH scheduled by DCI carried by the PDCCH. The UE checks whether the RAR includes random access response information for the preamble transmitted by the UE, i.e., Msg1. Presence or absence of random access information for the Msg1 transmitted by the UE may be determined based on presence or absence of a random access preamble ID for the preamble transmitted by the UE. If there is no response to the Msg1, the UE may retransmit the RACH preamble less than a predetermined number of times while performing power ramping, as illustrated in (b) of FIG. 10. The UE calculates PRACH transmission power for preamble retransmission based on most recent pathloss and a power ramping counter.

The random access response information includes timing advance information for UL synchronization, an UL grant, and UE temporary cell RNTI (C-RNTI). If a temporary UE receives random access response information for the UE itself on the PDSCH, the UE can know timing advance information for UL synchronization, an initial UL grant, and UE temporary cell RNTI (C-RNTI). The timing advance information is used to control uplink signal transmission timing. In order to ensure that the PUSCH/PUCCH transmission by the UE is better aligned with subframe timing at a network end, the network (e.g. BS) may measure a time difference between the PUSCH/PUCCH/SRS reception and subframes and send timing advance information based on the time difference. The UE may perform UL transmission as Msg3 of the random access procedure on a physical uplink shared channel based on the random access response information (e.g., see 1705 in (a) of FIG. 10). The Msg3 may include an RRC connection request and a UE identifier. The network may transmit Msg4 as a response to the Msg3, and the Msg4 may be handled as a contention resolution message on DL (e.g., see 1707 in (a) of FIG. 10). The UE may enter an RRC connected state by receiving the Msg4.

The contention-free random access procedure may be used or performed when the UE handovers to another cell or the BS or when the contention-free random access procedure is requested by a command of the BS. A basic process of the contention-free random access procedure is similar to the contention-based random access procedure. However, unlike the contention-based random access procedure in which the UE randomly selects a preamble to be used among a plurality of random access preambles, in the contention-free random access procedure, a preamble (hereinafter, referred to as a dedicated random access preamble) to be used by the UE is allocated by the BS to the UE. Information on the dedicated random access preamble may be included in an RRC message (e.g., a handover command) or may be provided to the UE via a PDCCH order. When the random access procedure is initiated, the UE transmits the dedicated random access preamble to the BS. When the UE receives the random access procedure from the BS, the random access procedure is completed.

As mentioned above, the UL grant in the RAR schedules PUSCH transmission to the UE. The PUSCH carrying initial UL transmission based on the UL grant in the RAR is also referred to as Msg3 PUSCH. The content of the RAR UL grant starts at an MSB and ends at a LSB, and is given in Table 7.

TABLE 7

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A TPC command is used to determine transmission power of the Msg3 PUSCH and is interpreted, for example, based on Table 8.

TABLE 8

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, a CSI request field in the RAR UL grant indicates whether the UE includes an aperiodic CSI report in the corresponding PUSCH transmission. A subcarrier spacing for the Msg3 PUSCH transmission is provided by an RRC parameter. The UE will transmit the PRACH and Msg3 PUSCH on the same uplink carrier of the same service serving cell. A UL BWP for Msg3 PUSCH transmission is indicated by SIB1 (SystemInformationBlock1).

FIG. 11 illustrates a 2-step RACH procedure. More specifically, (a) of FIG. 11 illustrates a contention-based random access (OBRA), and (b) of FIG. 11 illustrates a contention-free random access (CFRA).

In FIG. 11, message A (MSGA) includes a preamble and a PUSCH payload. The preamble and the PUSCH payload are multiplexed in a time division multiplexing (TDM)

scheme. Message B (MSGB) is a response to the message A (MSGA) and may be transmitted for contention resolution, fallback indication(s) and/or backoff indication.

TECHNICAL TERMS USED IN THE PRESENT DISCLOSURE

UE: User Equipment
SSB: Synchronization Signal Block
MIB: Master Information Block
RMSI: Remaining Minimum System Information
FR1: Frequency domain with frequency range less than or equal to 1.6 GHz (e.g., 450 MHz to 6,000 MHz).
FR2: Millimeter wave (mmWave) domain with frequency range greater than or equal to 2.24 GHz (e.g., 24,250 MHz to 52,600 MHz).
BW: Bandwidth
BWP: Bandwidth Part
RNTI: Radio Network Temporary Identifier
CRC: Cyclic Redundancy Check
SIB: System Information Block
SIB1: SIB1 for NR devices=RMSI (Remaining Minimum System Information). It broadcasts information, etc. necessary for cell access of an NR UE.
CORESET (Control Resource SET): time/frequency resource in which an NR UE tries candidate PDCCH decoding.
CORESET #0: CORESET for Type0-PDCCH CSS set for NR devices (configured at MIB)
Type0-PDCCH CSS set: a search space set in which an NR UE monitors a set of PDCCH candidates for a DCI format with CRC scrambled by a SI-RNTI
MO: PDCCH Monitoring Occasion for Type0-PDCCH CSS set
SIB1-R: (additional) SIB1 for reduced capability NR devices. It may be limited when it is generated with a separate TB from SIB1 and is transmitted on a separate PDSCH.
CORESET #0-R: CORESET #0 for reduced capability NR devices
Type0-PDCCH-R CSS set: a search space set in which a RedCap UE monitors a set of PDCCH candidates for a DCI format with CRC scrambled by a SI-RNTI
MO-R: PDCCH Monitoring Occasion for Type0-PDCCH CSS set
Cell defining SSB (CD-SSB): SSB including RMSI scheduling information among NR SSBs
Non-cell defining SSB (non-CD-SSB): SSB that has been deployed on NR sync raster, but does not include RMSI scheduling information of a corresponding cell for measurement. But, the SSB may include information informing a location of cell defining SSB.
SCS: Subcarrier Spacing
SI-RNTI: System Information-Radio Network Temporary Identifier
Camp on: "Camp on" is a UE state in which the UE stays on a cell and is ready to initiate a potential dedicated service or to receive an ongoing broadcast service.
TB: Transport Block
RSA (Redcap standalone): Redcap device or cell supporting only service.
SIB1(-R)-PDSCH: PDSCH transmitting SIB1(-R)
SIB1(-R)-DCI: DCI scheduling SIB1(-R)-PDSCH. DCI format 1_0 with cyclic redundancy check (CRC) scrambled by SI-RNTI.
SIB1(-R)-PDCCH: PDCCH transmitting SIB1(-R)-DCI
FDRA: Frequency Domain Resource Allocation
TDRA: Time Domain Resource Allocation
RA: Random Access
MSGA: Preamble and payload transmissions of a random access procedure for 2-step RA type.
MSGB: Response to MSGA in the 2-step random access procedure. The MSGB consists of response(s) for contention resolution, fallback indication(s), and backoff indication.
RO-N: RACH Occasion (RO) for normal UE 4-step RACH and 2-step RACH (if configured).
RO-N1, RO-N2: If a separate RO is configured for normal UE 2-step RACH, it is divided into RO-N1 (4-step) and RO-N2 (2-step).
RO-R: RACH Occasion (RO) that is configured separately from RO-N for RedCap UE 4-step RACH and 2-step RACH (if configured).
RO-R1, RO-R2: If a separate RO is configured for RedCap UE 2-step RACH, it is divided into RO-R1 (4-step) and RO-R2 (2-step).
PG-R: MsgA-Preambles Group for RedCap UEs In addition to 5G main use cases (mMTC, eMBB and URLLC), the importance/interest in the use case domain over mMTC and eMBB or mMTC and URLLC has recently increased. Hence, the need for UEs for efficiently supporting these use cases in terms of device cost, power consumption, form factor, etc. has increased.

In the present disclosure, a UE for the above purpose is called a (NR) reduced capability UE/device, or a (NR) RedCap UE/device for short. Further, distinguished from the RedCap device, a general NR UE that supports all or one or more of the 5G main use cases is called an NR (normal) UE/device or a non-redcap UE/device. The RedCap UE may be a UE that intentionally reduces some capabilities of 5G key capabilities (peak data rate, user experienced data rate, latency, mobility, connection density, energy efficiency, spectrum efficiency, and area traffic efficiency) defined in IMT-2020, in order to achieve all or part of low device cost/complexity, low power consumption, small form factor, etc.

The 5G use case domain over mMTC and eMBB or mMTC and URLLC that are target use cases of the RedCap device is called RedCap use cases for convenience of explanation in the present disclosure.

For example, the redcap use cases may be as follows.

[RedCap Use Cases]

Connected Industries

- Sensors and actuators are connected to 5G networks and core
- Include massive Industrial Wireless Sensor Network (IWSN) use cases and requirements
- Not only URLLC services with very high requirements, but also relatively low-end services with the requirement of small device form factors with a battery life of several years
- Requirements for these services are higher than Low Power Wide Area (LPWA) (i.e., LTE-M/NB-IOT) but lower than URLCC and eMBB.
- Devices in such environment include e.g. pressure sensors, humidity sensors, thermometers, motion sensors, accelerometers, actuators, etc.

Smart City

- The smart city vertical covers data collection and processing to more efficiently monitor and control city resources, and to provide services to city residents.

Especially, the deployment of surveillance cameras is an essential part of the smart city but also of factories and industries.

Wearables

Wearables use case includes smart watches, rings, eHealth related devices, and medical monitoring devices etc.

One characteristic for the use case is that the device is small in size.

Wearables

Reference bit rate: 10-50 Mbps in DL and >=5 Mbps in UL for smart wearable application Peak bit rate: 150 Mbps in DL and 50 Mbps in UL Battery: multiple days (up to 1-2 weeks)

An example of schematic use case specific requirements for the three typical

RedCap use cases is the same as Table 9.

TABLE 9

| Use cases | Complexity | Form factor | Bit rate (Mbps) | Latency (ms) | Mobility | Battery |
|---|---|---|---|---|---|---|
| Industrial Wireless Sensor | Very low | Very small | A few | Tens of/A few [1] | Stationary | Years |
| Video Surveillance | Low [2] | Small | A few/ Tens of | Hundreds of | Stationary | |
| Wearables | Low [2] | Small | Tens of | | Mobile | Weeks |

[1] safety related sensors

[2] Low complexity compared to the normal NR device

The RedCap use cases cannot be supported by low power wireless area (LPWA) UEs (e.g., LTE-M, NB-IoT, etc.) in terms of bit rate, latency, etc. The NR UE can functionally support the RedCap use cases, but the support may be ineffective in terms of the UE manufacturing cost, form factor, battery life, etc.

The fact that a RedCap UE having characteristics such as low cost, low power, small form factor, etc. supports the use case area in the 5G network can bring an effect of reducing the manufacturing cost and maintenance cost of the UEs.

The RedCap use cases have quite diverse requirements in terms of UE complexity, target bit rate, latency, power consumption, etc. The RedCap requirements may be divided into generic requirements applied to all the RedCap use cases and use case specific requirements applied only to specific use case(s).

For example, some typical generic and use case specific requirements may be as follows.

[Redcap Requirements]

Generic Requirements

Device complexity/cost: Main motivation for the new device type is to lower the device cost and complexity as compared to high-end eMBB and URLLC devices of Rel-15/Rel-16. This is especially the case for industrial sensors.

Device size: Requirement for most use cases is that the standard enables a device design with compact form factor Deployment scenarios: System should support all FR1/FR2 bands for FDD and TDD Use Case Specific Requirements Industrial Wireless Sensors reference bit rate: <2 Mbps (potentially UL heavy traffic)

end-to-end latency: <100 ms; ~5-10 ms for safety related sensors battery: at least few years communication service availability: 99.99% stationary

Video Surveillance

Reference bit rate: <2-4 Mbps for economic video; ~7.5-25 Mbps for high-end video (UL heavy traffic)

Latency: <500 ms

Reliability: 99%-99.9%.

The RedCap requirements can be satisfied by (combination of) various features provided by the UE and the BS. The followings are examples of features and sub-features supported by the UE/BS for satisfying the RedCap requirements.

[Redcap UE Features]

Complexity reduction features

Reduced number of UE RX/TX antennas

UE Bandwidth reduction

Half-Duplex-FDD

Relaxed UE processing time

Relaxed UE processing capability

Power Saving

Reduced PDCCH monitoring by smaller numbers of BDs and CCE limits

Extended DRX for RRC Inactive and/or Idle

RRM relaxation for stationary devices

Coverage recovery/enhancement

The RedCap use cases may define and support one or multiple UEs. The present disclosure considers all the following two cases (Case A/Case B).

Case A: Support the RedCap use cases in a single device type case

Case B: Support the RedCap use cases in multiple device type case

In the Case A, a RedCap UE may be a UE satisfying all the RedCap requirements (i.e., the generic requirements and the use case specific requirements), and/or may be a UE supporting all the RedCap use cases. In this case, because the UE shall simultaneously satisfy various requirements, there may be a factor increasing the cost due to an increase in the UE complexity, but at the same time, a cost reduction effect can be expected from mass production based on the expansion of use cases.

In the Case B, considering that the RedCap use case requirements are considerably diverse, a device type may be defined and supported for each RedCap use case. Even in this case, all the generic requirements may be commonly satisfied. In this instance, respective device types defined for each use case are referred to as RedCap device types. The Case B includes a case where several use cases that are similar in terms of requirements are grouped and supported in a single device type. These RedCap device types may be to support some or a specific combination previously defined among RedCap UE features. As above, when multiple RedCap device types are defined and support RedCap use cases, there is an advantage that specific RedCap use case(s)

can be supported through a RedCap UE that is more optimized in terms of cost, power consumption, etc. For example, an IWS use case may be supported through a dedicated UE that is very small, inexpensive, and power efficient.

The RedCap use cases and the generic requirements or the use case specific requirements mentioned in the present disclosure are not necessarily supported or satisfied, and it may be determined whether to support or satisfy them in a trade-off type considering factors such as cost/complexity, power consumption, and form factor of the RedCap device or the device type.

In the present disclosure, reduced capability may include the meaning of reduced/low complexity/low cost/reduced bandwidth, and the like.

Redcap Device Type Classification and Method of Reporting to BS

For the case where RedCap use cases are supported by multiple device types (i.e., Case B), the following methods may be considered to classify the RedCap device types. The following methods can be applied even to the Case A in order to distinguish the RedCap device from the NR UE.

In order to support an operation of the RedCap device distinguished from the NR UE, the RedCap device may have to report device type information of the RedCap device to the base station. FIG. 12 illustrates a flow chart of a procedure of reporting device type information to a base station. The reporting procedure may reuse a UE capability transfer procedure defined in a predefined standard (e.g., 3GPP TS 38.331), as follows. The base station may acquire RedCap device type information through UE capability information reception and may use UE information acquired upon the scheduling of the corresponding UE.

For example, the base station/network may request UE capability from the UE in RRC_CONNECTED state (SH102). And/or, the UE may transmit the RedCap device type information to UE capability information (SH104).

[Classification Method 1]

Redcap device types may be classified based on one of main requirements. Examples of the main requirements that can be the basis of classification may include supported max data rate (peak bit rate), latency, mobility (stationary/fixed, portable, mobile, etc.), battery lifetime, complexity, coverage, and the like. (Combination of) UE feature(s) that shall be mandatorily supported or can be selectively supported for each classified RedCap device type may be defined in a predefined standard (e.g., 3GPP Specification). This may be to reduce overhead separately signaling whether to support features for each device type. In the present disclosure, 'defined in a predefined standard' may mean that it is predefined/pre-configured/pre-promised between the UE and the base station.

Redcap device type information that is included in UE capability information and is reported by the UE to the base station/network may be, for example, a specific field of UE-NR-Capability information element (IE) (e.g., RedCap-DeviceType). For example, when the RedCap device types are classified into RedCap device type 1, 2, . . . , a value of RedCapDeviceType field may be expressed by an integer value such as 1, 2, . . . , or a combination of character and integer such as r1, r2, . . . . As above, the UE has an advantage of signaling overhead by including the device type and parameters related to it in capability information as one field and reporting it.

For example, the RedCap device types may be classified based on a supported max data rate, and the UE may report the RedCap device type to the base station based on this classification.

The supported max data rate of the NR UE may be defined/determined as the following Equation in a predefined standard (e.g., 3GPP TS 38.306).

Supported Max Data Rate

General

The DL and UL max data rate supported by the UE may be calculated by band or band combinations supported by the UE. A UE supporting NR (e.g., NR SA, MR-DC) shall support the calculated DL and UL max data rate defined in the following.

Supported Max Data Rate

For NR, the approximate data rate for a given number of aggregated carriers in a band or band combination may be computed by the following Equation 3.

[Equation 3]

$$\text{data rate (in Mbps)} = 10^{-6}\cdot\sum_{j=1}^{J}\left(v_{Layers}^{(j)}\cdot Q_m^{(j)}\cdot f^{(j)}\cdot R_{\max}\cdot\frac{N_{PRB}^{BW(j),\mu}\cdot 12}{T_s^{\mu}}\cdot\left(1-OH^{(j)}\right)\right)$$

Wherein J is the number of aggregated component carriers in a band or band combination.

$R_{max}$=948/1024

For the j-th CC, $$v_{Layer}^{(j)}$$

is the maximum number of supported layers given by higher layer parameter maxNumberMIMO-LayersPDSCH for downlink or higher layer parameters maxNumberMIMO-LayersCB-PUSCH and maxNumberMIMO-LayersNonCB-PUSCH for uplink.

$$Q_m^{(j)}$$

is the maximum supported modulation order given by higher layer parameter supportedModulationOrderDL for downlink and higher layer parameter supportedModulationOrderUL for uplink.

$f^{(j)}$ is the scaling factor given by higher layer parameter scalingFactor and can take the values 1, 0.8, 0.75, and 0.4.

μ is the numerology.

$$T_s^{\mu}$$

is the average OFDM symbol duration in a subframe for numerology p, i.e., $$T_s^{\mu}=\frac{10^{-3}}{14\cdot 2^{\mu}}.$$

Normal cyclic prefix is assumed.

$$N_{PRB}^{BW(j),\mu}$$

is the maximum RB allocation in bandwidth $BW^{(j)}$ with numerology μ, where $BW^{(j)}$ is the UE supported maximum bandwidth in the given band or band combination.

$OH^{(j)}$ is the overhead and takes the following values.

0.14, for frequency range FR1 for DL 0.18, for frequency range FR2 for DL 0.08, for frequency range FR1 for UL 0.10, for frequency range FR2 for UL Only one of the UL or SUL carriers is counted for a cell operating SUL.

The approximate maximum data rate can be computed as the maximum of the approximate data rates computed using the above Equation for each of the supported band or band combinations.

For single carrier NR SA operation, the UE shall support a data rate for the carrier that is no smaller than the data rate computed using the above Equation, with J=1 CC and component $$v_{Layers}^{(j)} \cdot Q_m^{(j)} \cdot f^{(j)}$$

is no smaller than 4.

For example, the value 4 in the component above can correspond to $$v_{Layers}^{(j)} = 1,\ Q_m^{(j)} = 4 \text{ and } f^{(j)} = 1.$$

For EUTRA in case of MR-DC, the approximate data rate for a given number of aggregated carriers in a band or band combination can be computed by the following Equation 4.

$$\text{Data rate (in Mbps)} = 10^{-3} \cdot \sum_{j=1}^{J} TBS_j \qquad \text{[Equation 4]}$$

Wherein J is the number of aggregated EUTRA component carriers in MR-DC band combination.

$TBS_j$ is the total maximum number of DL-SCH transport block bits received or the total maximum number of UL-SCH transport block bits transmitted, within a 1 ms TTI for j-th CC, as derived from a predefined standard (e.g., 3GPP TS36.213) based on the UE supported maximum MIMO layers for the j-th CC, and based on the maximum modulation order for the j-th CC and number of PRBs based on the bandwidth of the j-th CC according to indicated UE capabilities.

The approximate maximum data rate can be computed as the maximum of the approximate data rates computed using Equation 4 above for each of the supported band or band combinations.

For MR-DC, the approximate maximum data rate can be computed as the sum of the approximate maximum data rates from NR and EUTRA.

In this case, parameters required for the formula computing the supported max data rate that the NR UE shall support may be reported by the UE by a request of the base station in RRC_CONNECTED state. The parameters are as follows. The higher elements mean higher RRC information elements (IE) to which the parameters belong.

FeatureSetDownlink
  scaling Factor
FeatureSetDownlinkPerCC
  maxNumberMIMO-LayersPDSCH
  supportedModulationOrderDL
  supported BandwidthDL
  supportedSubCarrierSpacingDL
FeatureSetUplink
  scaling Factor
FeatureSetUplinkPerCC
  maxNumberMIMO-LayersCB-PUSCH
  maxNumberMIMO-LayersNonCB-PUSCH
  supportedModulationOrderUL
  supported BandwidthUL
  supportedSubCarrierSpacingUL For the RedCap UE, in a method of classifying the RedCap device types based on the supported max data rate, values of the parameters for each device type are defined in a predefined standard (e.g., 3GPP Specification), and the UE may indicate the RedCap device type information and information on the parameters to the base station by setting a value of RedCapDeviceType field of UE-NR-Capability IE to a specific value. Compared to the related operation that the NR UE includes the parameters in UE capability information and transmits it to the base station, the RedCap UE can expect an effect of signaling overhead reduction by reporting the device type and the parameters related to it through one field. The base station can acquire the device type, the supported max data rate, and the values of the parameters mentioned above through value of RedCapDeviceType field and use them in UE scheduling, etc.

[Classification Method 2]

Alternatively, RedCap device types may be classified based on (combination of) UR feature(s) that shall be mandatorily supported or can be selectively supported, not based on main requirements. This may be a more appropriate method when features that shall be supported or can be supported for each use case are clear.

(Combination of) UR feature(s) that is predefined for each RedCap device type in a predefined standard (e.g., 3GPP Specification) may be referred to as a feature set. A feature set that shall be mandatorily supported for each device type among (combination of) the UR feature(s) may be referred to as a mandatory feature set of the corresponding device type or specifying the device type.

In this method, definition of the RedCap device type may not be specified in the predefined standard (e.g., 3GPP Specification), and this may mean that the RedCap use cases are supported in separate device types supporting different feature sets.

In the above method, a RedCap UE may report a RedCap device type or use case(s) supported by the RedCap UE to a base station by reporting a predefined feature set to the base station. This can be seen as a method that more closely conforms to the basic philosophy of NR to support various use cases through various optional features without distinguishing a separate UE category. The feature set may be replaced by a combination of capability parameters (i.e., capability parameter set). The feature set may be a mandatory feature set defined in the predefined standard (e.g., 3GPP Specification) per RedCap device type.

For the above operation, a set of candidate features (i.e., feature pool) for RedCap device (type) may be defined or configured in the predefined standard (e.g., 3GPP Specification), and the RedCap device may report a mandatory feature set defined for each type based on a type of the RedCap device to the base station. The UE may additionally report an optional feature set in addition to the mandatory feature set to the base station. The UE may perform an additional operation or a more optimized operation for a specific use case by additionally selecting and reporting the optional feature set. For example, for a device type for a surveillance camera use case, when a wired power supply UE and a battery power supply UE coexist, the mandatory feature set does not include a power saving feature and may designate or include the optional feature. Hence, the UE may report the feature to the base station when selectively supporting the feature based on the detailed device type.

The base station may grasp whether to support the feature based on whether the corresponding parameter is present in the feature set reported by the RedCap UE, and reflect it upon the scheduling of the corresponding UE.

[Classification Method 3]

Alternatively, RedCap device types may be classified based on a combination of capability parameter(s). The combination of capability parameters classifying the RedCap device types may parameters determining the RedCap requirements. Examples of the capability parameters determining the RedCap device type may include UE supported bandwidth, modulation order, and number of MIMO layers determining a supported max data rate requirement supported by the UE. Values of the parameters may be a list of actually supportable values, or a maximum value among supported values.

For example, capability parameter(s) determining the RedCap device type may be as follows.

- Supported Bandwidth (NRB): (max) UE channel bandwidth or (max) UE transmission bandwidth; in units of RB
- Supported modulation order (Qm): Qm=2 for QPSK; 4 for 16 QAM; 6 for 64 QAM; etc.
- Supported number of MIMO layers (NL): replaceable with number of antennas (Na)

A combination of capability parameters determining the RedCap device type may be referred to as a capability parameter set of the corresponding device type. For example, the RedCap device type may be defined by classifying capability parameter set value(s) in ascending order (or descending order) of the supported max data rate. The following example is an example of defining M device types in ascending order of the supported max data rate.

Classification (example) of Redcap device types based on capability parameter set value(s):

- Device Type 1: {NL, NRB, Qm}={1, 25, 2}
- Device Type 2: {NL, NRB, Qm}={1, 25, 4}, or {1, 52, 2}
- Device Type 3: {NL, NRB, Qm}={1, 52, 4}, or {1, 106, 2}
- Device Type 4: {NL, NRB, Qm}={1, 106, 4}, or {2, 106, 2}
- Device Type 5: {NL, NRB, Qm}={1, 106, 6}
- Device Type 6: {NL, NRB, Qm}={2, 106, 4}
- Device Type 7: {NL, NRB, Qm}={2, 106, 6}
- Device Type M: {NL, NRB, Qm}={X, Y, Z}

For example, for NR frequency range 1 (FR1) (i.e., band of 6 GHz or less), NRB value may use one value among values defined in Table 10 (the number of configurable maximum RBs per UE channel bandwidth). The above example is value based on subcarrier spacing (SCS)=15 kHz. If the RedCap device supports SCS=30 kHz, and a cell that the RedCap device wants to access uses SCS=30 kHz for data transmission, the NRB value based on SCS=15 kHz in the above example may be replaced by a value corresponding to SCS=30 kHz with reference to Table 10.

Table 10 represents max transmission bandwidth configuration NRB per subcarrier spacing (SCS) at NR FR1.

TABLE 10

| SCS (kHz) | 5 MHz $N_{RB}$ | 10 MHz $N_{RB}$ | 15 MHz $N_{RB}$ | 20 MHz $N_{RB}$ |
|---|---|---|---|---|
| 15 | 25 | 52 | 79 | 106 |
| 30 | 11 | 24 | 38 | 51 |

In the device type classification example, the device Type 2/3/4 is a case of defining one device type using multiple capability set values. As above, when the device types are classified based on the supported max data rate, multiple capability parameter set values defining one device type may mean combinations supporting the same or similar supported max data rate.

Supportable device type(s) for each use case using the device type(s) defined in the above example may be defined as follows. Based on the supportable device type(s), the base station may restrict the cell access, or perform subscription based barring.

Supportable device type(s) (example) for each use case

IWS: Device types 1, 2

Video Surveillance: Device types 2, 3

Wearables: Device type: Device types 4, 5, 6, 7

In order to avoid an increase in cost due to market segmentation according to an excessive division of the device type, the number M of device types may be limited. For example, when M=1, the RedCap UE is not classified into the multiple device types, and can support all the target use cases in a single device type.

As another example, when M=3, device type classification and supportable device type(s) for each use case may be defined as follows.

Device type classification based on capability set value(s) (e.g., when M=3):

- Device Type 1: {NL, NRB, Qm}={1, 25, 2} (or {1, 25, 4} or {1, 52, 2})
- Device Type 2: {NL, NRB, Qm}={1, 52, 4} or {1, 106, 2}
- Device Type 3: {NL, NRB, Qm}={2, 106, 6}

Supportable device type(s) for each use case (e.g., when M=3)

IWS: Device types 1

Video Surveillance: Device types 3

Wearables: Device type: Device types 7

A UE max bandwidth (i.e., bandwidth capability of the RedCap UE) may be determined as a minimum bandwidth satisfying a bit rate required in a target use case. A UE max bandwidth reduction can reduce RF element and/or baseband processing cost and expect an effect of reducing power consumption. Herein, the required bit rate may mean a peak rate or the supported max data rate considering that the device manufacturing cost is determined by the peak rate or the supported max data rate not an average bit rate and a reference bit rate.

When determining the max bandwidth supporting the required bit rate, a specific value may be assumed for other parameters (e.g., number of antennas (NL), modulation order (Qm), etc.) determining the required bit rate. For example, in the above example, for Device Type 3, a peak rate of about ~28 MHz may be supported. In this instance, the required max bandwidth may be 20 MHz (106 RBs)

when {NL=1, Qm=2} is assumed, and 10 MHz (52 RBs) when {NL=1, Qm=4} is assumed. Or, the required max bandwidth may be 5 MHz (25 RBs) when {NL=2, Qm=4} is assumed.

Device Type 3: {NL, NRB, Qm}={1, 52, 4}, or {1, 106, 2}

Within the max UE bandwidth of the RedCap UE, a transmission bandwidth may be assigned and transmitted/received by network configuration using RRC signaling, etc.

A UE min bandwidth may be defined as a minimum value among NR UE channel bandwidths (or transmission bandwidths) greater than or equal or an NR SSB bandwidth.

For example, at FR1, the UE min bandwidth may be 5 MHz for NR SSB with SCS=15 kHz, and may be 10 MHz for NR SSB with SCS=30 kHz.

As another example, at FR2, the UE min bandwidth may be 40 MHz for NR SSB with SCS=120 kHz, and may be 80 MHz for NR SSB with SCS=240 kHz.

This may be to implement low power consumption and at the same time support an access on an NR cell via NR SSB by supporting a service, in which the required bit rate is small, at a minimum bandwidth.

[Classification Method 4]

Considering that a bandwidth capability of a RedCap UE is determined by a required bit rate of respective use cases, a RedCap device type may be classified based on a UE bandwidth capability. For example, a bandwidth capability determining the RedCap device type may be to represent a (max) UE channel bandwidth or a (max) UE transmission bandwidth (i.e., supported bandwidth (NRB)) in units of RB. Alternatively, the bandwidth capability may be a minimum UE channel bandwidth or a minimum UE transmission bandwidth. More specifically, the following classification is possible.

- Classification method 4-1) The RedCap device type is classified by a max bandwidth and is used by being configured with an actual data transmission/reception bandwidth (<=max bandwidth)
- Classification method 4-2) The RedCap device type is classified by a min bandwidth and is used by being configured with an actual data transmission/reception bandwidth (>=min bandwidth)
- Classification method 4-3) One or multiple supportable bandwidths (set) are defined for each device type, and is used by being configured with an actual data transmission/reception bandwidth within the corresponding bandwidth (set)

For the classification methods 4-1/2/3, the max bandwidth may be limited to a value (e.g., 20 MHz) less than an NR bandwidth, and the min bandwidth may be greater than or equal to an SSB bandwidth (e.g., 5 MHz for 15 kHz SSB).

Method of Early Transmission of UE Information (e.g., UE ID Information) for Redcap UE In an NR cell that supports redcap user equipment (UE), it may be preferred that NR UE and redcap UE share as many resources as possible in terms of resource efficiency. That is, in a cell where NR UE and redcap UE coexist or may coexist, it may be preferred that the NR UE and the redcap UE share as many resources as possible in terms of resource efficiency. In a case where resources available/schedulable for NR UE and resources available/schedulable for redcap UE are completely separated from each other, resource utilization is reduced, and the base station has limited scheduling flexibility. Due to this reason, it may be desirable that NR UE and redcap UE share as many resources as possible in a cell access process. In the present disclosure, resources available/schedulable for both NR UE and redcap UE may be referred to as shared resources.

However, in the following occasions, it may be necessary to distinguish redcap UE in an msg1 (message1) or msgA (messageA) step in a random access process for cell access.

- (Additional) repetition or the like for redcap UE is needed due to a difference in coverage performance between NR UE and redcap UE in an msg2 (e.g., random access response, RAR), msg4, or msgB step; for example, a repetition in a random access channel (RACH) process of redcap UE may be applied equally to at least one of Msg 1~4/Msg A~B or may be individually applied to each message by a separate configuration.
- Initial uplink bandwidth part (initial UL BWP) cannot be configured within a max UE bandwidth of redcap UE by taking into account the impact on legacy NR UE.
- The impact on NR UE in a random access process is unavoidable due to UE processing time relaxation or the like of redcap UE.

Due to the above-mentioned needs, the present disclosure proposes a method for transmitting UE type information (or UE information) to a base station at an early stage in a process in which redcap UE accesses a cell through a 2-step RACH procedure.

More specifically, the present disclosure proposes a method (hereinafter, first embodiment) for performing a redcap UE type indication based on MsgA and a method (hereinafter, second embodiment) for configuring an RO for redcap UE.

Hereinafter, the embodiments described in the disclosure are differentiated solely for ease of description, and some methods and/components of a certain embodiment may be replaced or combined with methods and/or components of another embodiment.

The foregoing description (e.g., 3GPP system, frame structure, NR system) may be applied in combination with the methods proposed in the disclosure or may be added up to clarify the technical characteristics of the methods proposed in the disclosure. For example, in the following embodiments, a redcap UE (type) indication may mean indicating redcap UEs that are classified based on at least one of the above-described Classification Methods 1 to 4 for redcap device type classification.

In the present disclosure, "()" may be construed that what is inside ( ) is either excluded or included.

In the present disclosure, "/" may be construed that what is separated by/is either entirely or only partially included.

First Embodiment

In this embodiment, a method for performing a redcap UE type indication (or redcap UE (type) indication) based on MsgA will be described.

A UE that performs a random access according to 2-step random access (RA) type may transmit msgA to UL and receive MsgB in response. A redcap UE that performs a random access for cell access according to 2-step RA type and may receive a configuration (or configuration information) required for the redcap UE by indicating to the base station that it is redcap UE (type) in an MsgA step. For example, as for the configuration required for the redcap UE, if (additional) repetition for the redcap UE is configured or a separate UL/DL BWP is configured for the redcap UE, an indication may be performed to move to the corresponding BWP.

An MsgA transmission may comprise a preamble (i.e., msgA-preamble) transmission through a physical random access channel (PRACH) and a payload transmission through a physical uplink shared channel (PUSCH) (i.e., msgA-PUSCH). In this instance, a redcap UE (type) indication through MsgA is possible in an msgA-preamble transmission step and/or an msgA-PUSCH transmission step.

Hereinafter, in the present disclosure, the first embodiment will be described differently fora method (hereinafter, Method 1-1) for performing a redcap UE indication in an MsgA-preamble transmission step, a method (hereinafter, Method 1-2) for performing a redcap UE indication in an MsgA-PUSCH transmission step, a method (hereinafter, Method 1-3) for determining a step for redcap UE indication, a method (hereinafter, Method 1-4) for selecting msgA-PUSCH resources of redcap UE, and a method (hereinafter, Method 1-5) for selecting MsgB of redcap UE.

The methods to be described below are differentiated solely for ease of description, and some components of any one method may be replaced or combined with components of another method.

Method 1-1

First, the method for performing a redcap UE indication in an MsgA-preamble transmission step will be described.

The base station may allow for sharing an RO with normal UE without configuring a separate RO to support 2-step RA type of redcap UE. Alternatively, the base station may configure a separate RO for redcap UE. For example, redcap UE may perform an implicit redcap UE indication by transmitting an MsgA-preamble on an RO for the redcap UE by the methods described below.

The methods to be described below are differentiated solely for ease of description, and some components of any one method may be replaced or combined with components of another method.

Method 1-1-1

First, a method for performing a redcap UE indication in an MsgA-preamble transmission step when there is no separate RACH occasion (RO) configured for redcap will be described. Here, when there is no separate RO configured for redcap, it may mean sharing an RO with normal UE. Also, Method 1-1-1 may be applied when the corresponding redcap UE wants to use an RO that can be shared with the normal UE even when there is a separate RO configured for redcap.

When there is no separate RO (RO-N2) configured for 2-step RA type of normal UE, the base station may allocate a separate msgA-preamble(s) for each synchronization signal block (SSB) for the sake of redcap UE. That is, when there is only an RO (RO-N) for normal UE 4-step RA type, the base station may allocate a separate msgA-preamble(s) for each SSB for the sake of redcap UE.

In the present disclosure, the msgA-preamble(s) allocated for redcap UE (type) indication through msgA-preamble may be referred to as PG-R (msgA-Preambles Group for Redcap UEs). For example, a physical broadcast channel (PBCH) (e.g., master information block (MIB)/system information block1 (SIB1)(-R) transmitted through SSB may include information related to PG-R. Each SSB may have the same or different information related to PG-R.

For example, in determining an msgA-preamble(s) belonging to PG-R, the base station may allocate, for each SSB, N preambles contiguous to 4-step and 2-step (if configured) OBRA preambles, except 4-step and 2-step (if configured) OBRA (contention based random access) preambles of normal UE, as the msgA-preambles belonging to PG-R.

As an example, preambles (or preamble indices) may be arranged for each SSB, in proximity to [OBRA preambles for normal UE|CBRA preambles for redcap UE 2-step RA type|CFRA (contention free random access) preambles] in the order listed.

As another example, when there are preambles even for 4-step RA type of redcap UE, preambles (or preamble indices) may be arranged for each SSB, in proximity to [CBRA preambles for normal UE|CBRA preambles for redcap UE 4-step RA type|CBRA preambles for redcap UE 2-step RA type|CFRA preambles] in the order listed.

N may be sent through higher layer configuration/system information. And/or, the redcap UE may determine msgA-preamble index (indices) by the N value alone.

And/or, the redcap UE may determine msgA-preamble index (indices) available for itself based on the N value. And/or, upon receiving the corresponding msgA-preamble index (indices), the base station may determine RACH for the redcap UE at an early stage, and the base station may configure a repetition or the like for the corresponding UE.

And/or, when there is a separate RO (RO-N2) configured for normal UE 2-step RA type, the redcap UE also may use RO-N2 if there is no separate RO configured for redcap 2-step RA type. And/or, the base station may configure whether to use RO-N1 (RO for normal UE 4-step RA type) or RO-N2 for the redcap 2-step RA type, based on higher layer signaling. The latter method may be used to permit redcap msgA-preamble transmission on RO-N1, or conversely, permit msg1-preamble transmission for redcap 4-step RA type on RO-N2.

Method 1-1-2

Next, a method for performing a redcap UE indication in an MsgA-preamble transmission step when there is a separate RO configured for redcap UE will be described. That is, a method for performing a redcap UE indication in an MsgA-preamble transmission step when an RO-R or RO-R1, RO-R2 is configured. For example, if RACH is performed through a separate RO for redcap UE, no RACH for NR UE may be permitted on the corresponding RO.

When the base station configures a separate RO for redcap UE, the base station may configure one RO (RO-R) or configure separate ROs for redcap UE 4-step RA type and 2-step RA type, respectively. In the present disclosure, the RO for 4-step RA type may be referred to as RO-R1, and the RO for 2-step RA type may be referred to as RO-R2. The RO-R may include preambles for redcap 2-step or not. For example, when the RO-R does not include preambles for redcap 2-step, the base station may configure no separate RO for redcap 2-step RA type.

For example, when the RO-R does not include preambles for redcap 2-step, the redcap 2-step RA type may allow sharing an RO with normal UE. For example, a configuration may be set in such a way that a RO-R is used when the redcap UE performs 4-Step RA, and that a RO-N and/or an RO-N2 is used/shared when the redcap UE performs 2-Step RA. For example, 4-Step RA resources are not shared, but 2-Step RA resources may be shared between the redcap UE and the NR UE. For example, msgA-preamble transmission of redcap UE may be performed on RO-N or RO-N2. The reason why an RO is shared with normal UE without configuring a separate RO for redcap 2-step RA type is because, if 2-step RA type is selected when the reference signal received power (RSRP) is at or above a particular value, no repetition for coverage recovery or extension or no separate msgA-PUSCH resources may be needed.

For example, if redcap UE has no problem with securing coverage and wants to attain good RSRP and perform 2-step RA, the 2-step RA may be performed by RO-Nx similarly to NR UE, in which case signal repetition may be omitted. A method for redcap UE to select and transmit an RA preamble through a configured RO when RO-R or RO-R1, RO-R2 is configured may be the same as/similar to normal UE performing RA on RO-N or RO-N1, RO-N2.

RO-R or RO-R1, RO-R2 each may be mapped to each of msgA-PUSCH resources (e.g., MsgA-PUSCH transmission resources of redcap which may not be used for Msg A of NR UE) configured separately for redcap based on higher-layer signaling. And/or, if there is no separate configuration, msgA-PUSCH resources configured for normal UE may be used. As a mapping rule for Preambles-to-msgA-PUSCH resources, the same method as for normal UE may be used. And/or, msgA-PUSCH resources may be selected as a way of selecting msgA-PUSCH resources for redcap UE as in Method 1-4.

PG-R may be used for a purpose of indicating to the base station msgA-PUSCH resource information which a UE that has selected an msgA-preamble belonging to PG-R has to use or may use. Redcap UE may indicate to the base station msgA-PUSCH resources through msgA-preamble transmission belonging to PG-R. For example, an msgA-PUSCH resource(s) may be determined based on the msgA-preamble selection. The base station may find out through which resources the corresponding redcap UE is going to transmit msgA-PUSCH by receiving an msgA-preamble. In this instance, the msgA-PUSCH resources used for each PG-R may be pre-configured based on higher-layer signaling.

Meanwhile, if there is configuration (separate signaling) for msgA-PUSCH resources connected to PG-R, the redcap UE may share the msgA-PUSCH resource(s) with the normal UE. For example, while resources for msgA preamble transmission may be configured/defined in such a way that the redcap UE shares them with the NR UE, resources for msgA PUSCH transmission may be configured/defined in such a way the redcap UE and the NR UE share them. In the case where the redcap UE shares msgA-PUSCH resources with the normal UE, multiple (e.g., N) msgA-preambles may be mapped to one msgA-PUSCH resource in a similar way to the normal UE. For example, the N value for determining a preamble-to-PUSCH resource mapping ratio may be determined by the ratio between the total number of (valid) msgA-preambles available for actual transmission and the total number of (valid) msgA-PUSCH resources available for actual transmission.

And/or, the same preamble-to-PUSCH resource mapping ratio (i.e., N-to-1) as for the normal UE may be used based on the total number of (valid) msgA-preambles available for actual transmission with respect to normal UE. This is for allowing the redcap UE and the normal UE who are sharing PUSCH resources to use the same spatial filter in PUSCH transmission.

And/or, only a part (subset) of PUSCH resources (or PO (paging occasions)) for the normal UE may be shared with the redcap UE. In this instance, a mask index may be used to represent PUSCH resources (or POs) not shared with the redcap (or redcap UE). The mask index value may be configured based on higher-layer signaling.

msgA-PUSCH resource information for the redcap UE may further include at least one of the following parameters, unlike the normal UE.

(1) UL BWP that Transmits msgA-PUSCH

A separate UL BWP which is different from a UL BWP for msgA-preamble transmission A separate UL BWP may be needed due to reasons like bandwidth limitation of redcap UE, repetition, etc.

(2) DL BWP that Receives msgB

A separate DL BWP which is different from an initial DL BWP for receiving a control resource set (CORESET) #0.

A separate DL BWP may be needed due to reasons like bandwidth limitation of redcap UE, repetition, etc.

(3) Repetition-Related Information (e.g., Repetition Number, Type, Etc.)

It may be needed for coverage recovery or extension.

And/or, PG-R may be used for a purpose of indicating to the base station different msgA-PUSCH resource information for subdivisions of PG-R (e.g., PG1-R, PG2-R, etc.). For example, different msgA-PUSCH resource information may include msgA-PUSCH resource(s), downlink (DL), or UL BWP, repetition number, and/or UE DL Rx or UL Tx antenna number (and/or a corresponding maximum number of MIMO layers), and so on. This method may be useful when there are various device types in terms of bandwidth, number of antennas (and a corresponding maximum number of MIMO layers), coverage, transport block size (TBS) that can be supported, and so on, and when the sharing of msgA-PUSCH resources and parameter settings between device types is inefficient.

Method 1-2

Next, a method for performing redcap UE indication in an MsgA-PUSCH transmission step will be described.

In NR, 64 preambles may be allocated for one RO. Considering that these preambles may be used for distinguishing SSB and 2-step RA type, it may be difficult to allocate a separate msg preamble for redcap. In this case, redcap UE may share an RO and an msgA-preamble with normal UE in an msgA-preamble transmission step, and a redcap UE (type) may be indicated in an msgA-PUSCH transmission step through the following methods. Method 1-2 may be performed separately from Method 1-1, or may be performed as an alternative for Method 1-1, or both Method 1-1 and Method 1-2 may be performed.

The methods to be described below are differentiated solely for ease of description, and some components of any one method may be replaced or combined with components of another method.

Method 1-2-1

An MsgA-PUSCH payload may contain a redcap UE (type) indication (or redcap UE (type) information).

MsgA-PUSCH is used for payload transmission in 2-step RA type, and redcap UE (type) information may be included in a payload transmitted on msgA-PUSCH and indicated to the base station. The payload may be in the form of a medium access control-control element (MAC CE) or a radio resource control (RRC) message. Alternatively, the payload may be encoded along with a conventional msgA-PUSCH payload and transmitted in the same transport block TB. Since the MMC CE and the RRC message have a high decoding latency, an excessive delay may occur in an MsgB reception that is expected after MsgA transmission.

Method 1-2-2

A redcap UE (type) indication (or redcap UE (type) information) may be transmitted through an MsGA-PUSCH scrambling sequence.

To solve the problem of excessive delay with the method of transmitting redcap information in an MsgA-PUSCH payload, redcap UE (type) information or a redcap UE indication may be transmitted through an msgA-PUSCH scrambling sequence. The MsgA-PUSCH scrambling sequence may be generated by initializing a sequence generator by the following Equation 5:

$$c_{init}=n_{RNTI}\cdot 2^{16}+n_{RAPID}\cdot 2^{10}+n_{ID} \quad \text{[Equation 5]}$$

wherein $n_{RNTI}$ equals the RA-RNTI for msgA, $n_{RAPID}$ is the index of the random-access preamble transmitted for msgA, and $n_{ID}\in\{0, 1, \ldots, 1023\}$ equals the higher-layer parameter msgA-dataScramblingIdentity if configured, $$n_{ID} = N_{ID}^{cell}$$

otherwise.

In order to distinguish an initialization value of an msgA-PUSCH scrambling sequence generator from normal UE while the normal UE and the redcap UE share an RO and a preamble, the base station may configure a separate scrambling ID (nID)(value) for the redcap UE (e.g., configuration/system information by higher-layer signaling) and allow the corresponding value to be used for the initialization of the msgA-PUSCH scrambling sequence. The base station may find out whether the corresponding UE is NR UE (normal UE) or redcap UE, based on the scrambling ID used for msgA-PUSCH.

Method 1-2-3

Redcap UE (type) information may be transmitted in an msgA-PUSCH transmission step in the form of uplink control information (UCI).

A redcap UE may transmit redcap UE (type) information in a similar form to UCI. For example, the redcap UE may encode the redcap UE (type) information separately from a TB in which a PUSCH payload is transmitted, and then multiplex it on an msgA-PUSCH. This method, together with the above msgA-PUSCH scrambling sequence method, has lower latency than the method of transmission in the form of a MAC CE or RRC message.

Method 1-2-4

A redcap UE (type) indication (or redcap UE (type) information) may be transmitted in an msgA-PUSCH transmission step through distinguished msgA-PUSCH resources.

The base station/network may configure MsgA-PUSCH resources separately for redcap use (so as to be distinguished from those for normal UE). And/or, the redcap UE may transmit redcap UE (type) information to the base station by transmitting an msgA-PUSCH using msgA-PUSCH resources for the redcap UE. That is, an implicit indication that the UE is redcap UE may be transmitted. This method is for making a distinction through PUSCH transmission resources, and has an advantage in terms of latency compared to the above method of making a distinction by an MAC CE or an RRC message. On the other hand, the base station may have to make a reception attempt for msgA-PUSCH resources for the normal UE and the redcap UE, separately.

Method 1-3

Next, a method of determining a step (or method) for redcap UE indication will be described.

A redcap UE may determine whether to transmit redcap UE (type) information in an msgA-preamble step (i.e., Method 1-1) or in an msgA-PUSCH step (i.e., Method 1-2), based on configuration information by higher layer signaling related to MsgA of a cell it wants to access.

For example, if preambles for redcap are configured by higher layer signaling, the redcap UE may perform a redcap UE indication through an msgA-preamble. And/or, if preambles for redcap and msgA-PUSCH resources for redcap are configured by higher layer signaling, the redcap UE may perform an indication through an msgA-preamble. And/or, if preambles for redcap are not configured by higher layer signaling, but only msgA-PUSCH resources for redcap are configured by higher layer signaling, the redcap UE may perform an indication using the msgA-PUSCH resources.

Method 1-4

Next, a method for selecting msgA-PUSCH resources for redcap UE will be described.

The methods to be described below are differentiated solely for ease of description, and some components of any one method may be replaced or combined with components of another method.

Method 1-4-1 msgA-PUSCH resources for redcap UE may be selected by higher layer configuration (or higher layer signaling).

msgA-PUSCH resources selected by redcap UE in 2-step RA type may be indicated or configured by higher layer configuration information. The higher layer configuration information may include at least one of information on msgA-PUSCH resources specifically for redcap UE, information on whether msgA-PUSCH are configured or not, information on msgA-PUSCH resources connected/related to PG-R selected by redcap UE, and/or information on whether connected/related msgA-PUSCH resources are configured or not. And/or, the higher layer configuration information may include indication information indicating the use of a specific msgA-PUSCH resource(s) or a specific msgA-PUSCH resource(s) so that redcap UE selects and uses some of a plurality of configured msgA-PUSCH resources. Alternatively, indication information indicating the use of a specific msgA-PUSCH resource(s) or a specific msgA-PUSCH resource(s) may be transmitted and received so that the redcap UE selects and uses some of a plurality of configured msgA-PUSCH resources through separate signaling (e.g., lower layer signaling/physical channel/MAC-CE/DCI).

Method 1-4-2 msgA-PUSCH resources for redcap UE may be selected by redcap BW and initial UL BWP.

A redcap UE may determine msgA-PUSCH resources based on information on redcap BW and initial UL BWP. For example, the redcap BW may be a max UE bandwidth or a UE bandwidth used for initial access. In this instance, MsgA-related higher layer configuration information may be additionally used as follows. For example, if msgA-PUSCH resources for redcap are configured by higher layer signaling and redcap BW<initial UL BWP, the redcap UE may select the msgA-PUSCH resources for redcap. Otherwise, the redcap UE may select msgA-PUSCH resources for normal UE.

As another example, if both preambles for redcap and msgA-PUSCH resources for redcap are configured by higher layer signaling and redcap BW<initial UL BWP, the redcap UE may select the msgA-PUSCH resources for redcap. Otherwise, the redcap UE may select the msgA-PUSCH resources for normal UE.

Additionally, a priority order may be set among a plurality of msgA-PUSCH resources, and msgA-PUSCH resource(s) may be determined based on the priority. The priority order may be predefined in a predefined specification (e.g., 3GPP specification) or may be configured by higher layer signaling. And/or, a plurality of msgA-PUSCH resources may be selected in addition to the above condition or in combination with the above condition. A priority mechanism may be used to control traffic between the normal UE and the redcap UE.

As another example, if msgA-PUSCH resources for redcap are configured by higher layer signaling and redcap BW>=initial UL BWP, the redcap UE may select the msgA-PUSCH resource(s) based on the priority order. For example, even if redcap BW>=initial UL BWP, the msgA-PUSCH resources for redcap may be used if they are a high priority.

Method 1-4-3 msgA-PUSCH resources for redcap UE may be selected by redcap BW and an msgA-PUSCH transmission frequency band.

The redcap UE may determine msgA-PUSCH resources it is going to use based on information on the redcap BW (bandwidth) and the msgA-PUSCH transmission frequency band. For example, the redcap BW may be a max UE bandwidth or a UE bandwidth used for initial access. The MsgA-PUSCH transmission frequency band may be determined based on an msgA-PUSCH resource configuration value or information. And/or, an msgA-PUSCH transmission frequency band for an intra-slot frequency hopping operation using the configuration value may include a frequency domain resource before or after frequency hopping.

For example, if the transmission frequency band of msgA-PUSCH resources in consideration of frequency hopping exceeds the redcap BW, the msgA-PUSCH resources configured for redcap may be selected.

The above methods are a method for selecting resources for use in actual transmission when a plurality of msgA-PUSCH resources can be selected, which is not limited to redcap UE but also may apply to normal UE.

Method 1-5

Next, a method for receiving MsgB (or RAR) of redcap UE will be described.

After transmitting an MsgA, the redcap UE may receive MsgB during an msgB-response window period in response to the MsgA. For MsgB reception, the redcap UE may monitor a physical downlink control channel (PDCCH) (e.g., msgB PDCCH) in order to receive an msgB scheduling DCI with CRC (cyclic redundancy check) scrambled by msgB RA-RNTI (or msgB-RNTI). The MsgB scheduling DCI may include information required for PDSCH (e.g., msgB PDSCH) for transmitting an MsgB. The msgB PDCCH and the msgB PDSCH may be transmitted in CORESET #0 BW. If the bandwidth of the redcap UE is smaller than CORESET #0 BW, msgB PDCCH and msgB PDSCH reception may be impossible or the performance may be degraded. If redcap UE is not able to receive part of CORESET #0 BW, a separate msgB-RNTI (and/or msgB-R (reduced)-RNTI) for the redcap UE which is distinguished from normal UE may be defined and used in order to distinguish an msgB scheduling DCI for the redcap UE from the one for normal UE.

MsgB-R-RNTI may be determined by adding a specific value (e.g., 14*80*8*2*2=35840) to an msgB-RNTI calculation formula in order to use a value that is not used by an msgB-RNTI of the normal UE. A DCI with a CRC scrambled by MsgB-R-RNTI may be different in DCI content configuration or analysis from a DCI with a CRC scrambled by msgB-RNTI. For example, a DL bandwidth for FDRA (frequency domain resource allocation) may be a redcap bandwidth, rather than CORESET #0 BW. And/or, a slot offset (K0) and/or start symbol (S) indicated through a TDRA (time domain resource allocation) field may have a different value or be analyzed differently in consideration of frequency returning or timing relaxation of the redcap UE.

And/or, there may be a field that indicates to move to a separate DL BWP and receive an MsgB. And/or, there may be a field that indicates to move to a DL BWP pre-configured by higher layer signaling and receive an MsgB when detecting a corresponding DCI. And/or, in the above case, an operation of moving to a particular DL BWP and receiving an msgB may be replaced with an operation of moving to a particular UL BWP and starting a 2-step or 4-step random access (starting from preamble transmission).

And/or, the above method (Method 1-5) may distinguish msgB-RNTs (or RA-RNTIs) between UEs and monitor PDCCH by separate msgB-RNTIs (or RA-RNTIs), in order to receive msgB (or RAR) scheduling DCIs separately, regardless of UEs (e.g., normal UE and redcap UE) sharing an RO that have transmitted separate preambles through the shared RO. msgB (or RAR) scheduling DCIs need to be distinguished between normal UE and redcap UE because, when there are many normal UEs (or normal UE+redcap UE) expecting MsgB (or RAR), thus leading to a large MsgB (or RAR message) size and making it difficult for the base station to schedule msgB (e.g., RAR) PDSCH within a redcap BW while maintaining the code rate, an msgB (or RAR) PDSCH for redcap UE may be configured separately from the one for normal UE and scheduled within the redcap BW.

In this case, the msgB (or RAR) scheduling DCI for the redcap UE may have an addition of parameters such as time/frequency domain resource allocation (including BWP configuration), repetition information, etc. or be analyzed differently, compared with the normal UE.

And/or, the above method 1-5 may be limited to when there is no separate RO configured for redcap, i.e., an RO is shared with the normal UE. If the redcap UE transmits a preamble by a separate RO from the one for the normal UE, it may be because its msgB-RNTI is different from the one for the normal UE even in a conventional method. Alternatively, the above method may be applied for MsgB (or RAR) reception of the redcap UE regardless of whether the redcap UE shares an RO with the normal UE or not.

For example, FIG. 13 illustrates an example of a 2-step RACH process of redcap UE (R-UE) based on the above-described embodiment. A method proposed in the present disclosure is not limited to FIG. 13.

Referring to FIG. 13, R-UE may obtain downlink synchronization, system information, and RACH-related information through an SSB (V310) and higher layer signaling (V320). The RACH-related information may include, but not limited to, at least one of RO resource information for R-UE, RO-R1/2 and/or PG-R related information of the R-UE for performing a 2-step RACH, and/or msgA-PUSCH-related information.

The R-UE may determine at least one of an MsgA-preamble and/or an MsgA-PUSCH resource based on the RACH-related information (V330). When the MsgA-PUSCH resource is implicitly determined/linked based on the MsgA-preamble, the determination of the MsgA-PUSCH resource may be omitted. Alternatively, the determination of the MsgA-PUSCH resource may be performed separately from the determination/transmission of the MsgA-preamble. Various embodiments for this and at least one of the Methods 1-1 through 1-5 may be referenced.

The R-UE may transmit the MsgA-preamble at least once (V331) and may transmit the MsgA-PUSCH at least once (V322). At least one of the MsgA-preamble and the MsgA-PUSCH may be repeatedly transmitted.

Information/collection/resources for repeated transmission may be determined in advance in V330. At least one of the MsgA-preamble and the MsgA-PUSCH may (explicitly/implicitly) indicate that an entity performing the corresponding RACH is an R-UE or may include information indicating this.

The base station may find out that the entity performing the corresponding RACH is an R-UE, based on at least one of the MsgA-preamble and the MsgA-PUSCH (V335).

The base station may configure/generate an MsgB based on reception of an MsgA from the R-UE. The base station may transmit the MsgB to the R-UE at least once (V340).

Second Embodiment

In this embodiment a method for configuring an RO for redcap UE will be described.

In an NR cell access step, an RO for 4-step/2-step RA type of normal UE may be configured in the form of frequency division multiplexing (FDM) within an initial UL BWP. The normal UE may refer to RACH configuration parameters (i.e., FrequencyStart and msg1-FDM) transmitted in SIB1 (-R) in order to determine a location on a frequency of an FDMed RO (see Table 11 and/or Table 12 below). A starting point (e.g., FrequencyStart) on a frequency of an RO may be configured within the initial UL BWP, up to 8 FDMs (e.g., msg1-FDM) may be configured, and a frequency band occupied by the RO may be indicated.

If the redcap UE shares an RO with the normal UE, the max UE bandwidth of the redcap UE may be exceeded depending on a preamble format. In this case, the number of FDMs for the RO may be limited in order to limit the RO within the redcap bandwidth for the redcap UE. However, this limits access from conventional normal UE, which may not be desirable. Accordingly, in the case of the redcap UE, an RO configuration for PRACH transmission of the redcap UE may be allowed outside the initial UL BWP of the redcap UE which is defined within the max UE bandwidth of the redcap UE, in order to permit an RO for the redcap UE without limiting the number of RO FDMs allowed for the conventional normal UE.

The above method may be applied only within the same carrier bandwidth. And/or, the above method may be applied only when an RO is shared with normal UE. That is, the above method may be applied only when there is no separate RO configured for redcap UE. And/or, the above method may be applied only when a separately/additionally configured initial UL BWP is smaller than an existing configured initial UL BWP (for normal UE) and an RO is shared. A separate initial UL BWP (or information on the initial UL BWP) for the redcap UE may be contained in SIB1, or may be transmitted in a separate SIB1 (SIB1-R).

Table 11 shows RACH-ConfigGeneric information element (IE). The IE RACH-ConfigGeneric is used to specify random access parameters for regular random access and beam failure recovery.

TABLE 11

```
-- ASN1START
-- TAG-RACH-CONFIGGENERIC-START
RACH-ConfigGeneric ::=            SEQUENCE {
  prach-ConfigurationIndex                INTEGER (0..255),
  msg1-FDM                          ENUMERATED {one, two, four, eight} ,
  msg1-FrequencyStart                   INTEGER (0..maxNrofPhysicalResourceBlocks−1),
  zeroCorrelationZoneConfig               INTEGER(0..15),
  preambleReceivedTarget Power            INTEGER (−202..−60),
  preambleTransMax                    ENUMERATED {n3, n4, n5, n6, n7, n8, n10, n20, n50, n100,
n200},
  powerRampingStep                    ENUMERATED {dB0, dB2, dB4, dB6},
  ra-ResponseWindow                   ENUMERATED {sl1, sl2, sl4, sl8, sl10, sl20, sl40,
s180},
  ...,
  [[
  prach-ConfigurationPeriodScaling-IAB-r16       ENUMERATED
{scf1,scf2,scf4,scf8,scf16,scf32,scf64}                  OPTIONAL,   -- Need R
  prach-ConfigurationFrameOffset-IAB-r16        INTEGER (0..63)
OPTIONAL,   -- Need R
  prach-ConfigurationsOffset-IAB-r16          INTEGER (0..39)
OPTIONAL,    -- Need R                ENUMERATED { sl60, sl160}
  ra-ResponseWindow-v1610                 INTEGER (256..262)
OPTIONAL, -- Need R
  prach-ConfigurationIndex-v1610
OPTIONAL -- Need R
  ]]
}
-- TAG-RACH-CONFIGGENERIC-STOP
-- ASN1STOP
```

wherein msg1-FDM represents the number of PRACH transmission occasions FDMed in one time instance. Msg1-FrequencyStart represents the offset of the lowest PRACH transmission occasion in frequency domain with respect to PRB 0. The value is configured so that the corresponding RACH resource is entirely within the bandwidth of the UL BWP. powerRampingStep represents power ramping steps for PRACH. prach-ConfigurationFrameOffset-IAB represents a scaling factor for ROs defined in a baseline configuration indicated by prach-ConfigurationIndex. prach-ConfigurationFrameOffset-IAB may be used only by the IAB-MT. Prach-ConfigurationIndex represents a PRACH configuration index. prach-ConfigurationPeriodScaling-IAB represents a scaling factor to extend the periodicity of the baseline indicated by prach-ConfigurationIndex. prach-ConfigurationSOFFset-IAB represents a subframe/slot offset for ROs defined in a baseline configuration indicated by prach-ConfigurationIndex. preambleReceivedTargetPower represents the target power level at the network receiver side. preambleTransMax represents the maximum number of RA preamble transmissions performed before declaring a failure. ra-ResponseWindow represents an Msg2 (RAR) window length in number of slots. zeroCorrelationZoneConfig represents N-CS configuration. Table 12 shows an RACH-ConfigGenericTwoStepRA information element (IE). The IE RACH-ConfigGEnericTwoStepRA is used to specify the 2-step random access type parameters.

TABLE 12

```
-- ASN1START
-- TAG-RACH-CONFIGGENERICTWOSTEPRA-START
RACH-ConfigGenericTwoStepRA-r16 ::=        SEQUENCE {
  msgA-PRACH-ConfigurationIndex-r16          INTEGER (0..262)
OPTIONAL, -- Cond 2StepOnly
  msgA-RO-FDM-r16                          ENUMERATED {one, two, four, eight}
OPTIONAL, -- Cond 2StepOnly
  msgA-RO-FrequencyStart-r16                 INTEGER (0..maxNrofPhysicalResourceBlocks−1)
OPTIONAL, -- Cond 2StepOnly
  msgA-ZeroCorrelationZoneConfig-r16           INTEGER (0..15)
OPTIONAL, -- Cond 2StepOnly
  msgA-PreamblePowerRampingStep-r16            ENUMERATED {dB0, dB2, dB4, dB6}
OPTIONAL, -- Cond 2StepOnlyNoCFRA
  msgA-PreambleReceivedTargetPower-r16         INTEGER (−202..−60)
OPTIONAL, -- Cond 2StepOnlyNoCFRA
  msgB-ResponseWindow-r16                    ENUMERATED {sl1, sl2, sl4, sl8, sl10, sl20, sl40,
sl80, sl160, sl320}
OPTIONAL, -- Cond NoCFRA
  preambleTransMax-r16                       ENUMERATED {n3, n4, n5, n6, n7, n8, n10, n20, n50,
n100, n200} OPTIONAL, -- Cond 2StepOnlyNoCFRA
  ...
}
-- TAG-RACH-CONFIGGENERICTWOSTEPRA-STOP
-- ASN1STOP
```

wherein msgA-PreamblePowerRampingStep represents power ramping steps for msgA PRACH. msgA-PreambleReceivedTargetPower represents the target power level at the network receiver side. msgA-PRACH-ConfigurationIndex represents a cell-specific PRACH configuration index for 2-step RA type. msgA-RO-FDM represents the number of msgA PRACH transmission occasions FDMed in one instance. msgA-RO-FrequencyStart represents the offset of the lowest PRACH transmission occasions in frequency domain with respect to PRB 0. msgA-ZeroCorrelationZoneConfig indicates an N-CS configuration for msgA preamble. msgB-ResponseWindow represents an msgB monitoring window length in number of slots. preambleTransMax indicates the maximum number of RA preamble transmissions performed before declaring a failure. 2StepOnly is mandatory present if there are no 4-step random access configurations configured in the BWP. 2StepOnlyNoCFRA is mandatory present if RACH-ConfigGenericTwoStepRA is included in the RACH-ConfigCommonTwoStepRA and there are no 4-step random access configurations configured in the BWP. NoCFRA is mandatory present if RACH-ConfigGenericTwoStepRA is not included in CFRA-TwoStep in RACH-ConfigDedicated.

FIG. 14 is a flow chart illustrating an operation method of a UE described in the present disclosure.

Referring to FIG. 14, firstly, UE (100/200 of FIGS. 16 to 19) may transmit an MsgA-preamble to a base station in the step S1401.

For example, an operation in which the UE transmits an MsgA-preamble in the step S1401 may be implemented by the above-described device of FIGS. 16 to 19. For example, referring to FIG. 17, one or more processors 102/202 may control one or more memories 104/204 and/or one or more transceivers 106/206 in order to transmit an MsgA-preamble.

And/or, the UE (100/200 of FIGS. 16 to 19) may transmit a physical uplink shared channel (PUSCH) to the base station in the step S1402. And/or, resources of the MsgA-PUSCH may be determined based on the MsgA-preamble. In other words, MsgA-preambles may be mapped one on one to the resources of the MsgA-PUSCH, and the resources of the MsgA-PUSCH may be determined by the transmitted MsgA-preamble.

And/or, the redcap UE and the normal UE may share some of the entire MsgA-PUSCH resources, and unshared MsgA-PUSCH resources may be determined based on a mask index. For example, the mask index may be information representing or indicating shared MsgA-PUSCH resources or unshared MsgA-PUSCH resources. For example, the mask index may be a value corresponding to or indicating a bitmap representing shared MsgA-PUSCH resources or unshared MsgA-PUSCH resources.

For example, an operation in which the UE transmits an MsgA-PUSCH in the step S1402 may be implemented by the above-described device of FIGS. 16 to 19. For example, referring to FIG. 17, one or more processor 102/202 may control one or more memories 104/204 and/or one or more transceivers 106/206 in order to transmit an MsgA-PUSCH.

And/or, in the step S1403, the UE (100/200 of FIGS. 16 to 19) may receive an MsgB from the base station on the basis of the MsgA-preamble and the MsgA-PUSCH. For a more detailed operation/description for transmitting and receiving an MsgA (i.e., MsgA-preamble/MsgA-PUSCH) and an MsgB, what has been described of random access with reference to FIGS. 10 and 11 will be referenced.

Particularly, the MsgA-preamble or the MsgA-PUSCH may (explicitly or implicitly) indicate that the UE is a reduced capability (RedCap) UE. That is, the indication that the UE is a RedCap UE may be performed on the basis of the MsgA-preamble or the MsgA-PUSCH. For example, the above-described redcap device type classification and the method of reporting to the base station will be referenced regarding an operation of indicating that the UE is a RedCap UE.

For example, N preambles among contention free random access (CFRA) preambles of the normal UE (e.g., a UE other than the RedCap UE), which are contiguous to a contention based random access (CBRA) preamble of the normal UE, may be allocated for the RedCap UE, based on there being no random access channel occasion (RO) configured for the RedCap UE. And/or, the MsgA-preamble may be one of the N preambles. And/or, information on the N may be configured based on higher layer signaling or system information.

And/or, preambles corresponding to an RO for a 2-step random access (RA) of the normal UE (e.g., a UE other than the RedCap UE) may be used for the RedCap UE, based on there being no random access channel occasion (RO) configured for the RedCap UE and there being the RO configured for the 2-step random access (RA) of the normal UE. And/or, the MsgA-preamble may be one of the preambles corresponding to the RO for the 2-step RA of the normal UE.

A more detailed operation/description or an operation/description for replacing or combining with the above operation(s) will be given with reference to Method 1-1-1.

And/or, the preambles corresponding to the RO of the normal UE (e.g., a UE other than the RedCap UE) may be used for the RedCap UE, based on there being a random access channel occasion (RO) configured for a 4-step random access (RA) of the RedCap UE and there being no RO configured for the 2-step RA of the RedCap UE. And/or, the MsgA-preamble may be one of the preambles corresponding to the RO of the normal UE.

A more detailed operation/description or an operation/description for replacing or combining with the above operation(s) will be given with reference to Method 1-1-2.

And/or, the MsgA-PUSCH may include information indicating that the UE is the RedCap UE. For a more detailed operation/description, Method 1-2-1 will be referenced. Also, in order to indicate that the UE is a RedCap UE based on MsgA-PUSCH, Method 1-2-2/Method 1-2-3/Method 1-2-4 may be applied, or Method 1-2-2/Method 1-2-3/Method 1-2-4 may be applied in combination with Method 1-2-1.

And/or, the UE may be indicated to be the RedCap UE by the MsgA-preamble, based on there being MsgA-preambles configured for the RedCap UE or based on there being the MsgA-preambles configured for the RedCap UE and MsgA-PUSCH resources configured for the RedCap UE, and the UE may be indicated to be the RedCap UE by the MsgA-PUSCH, based on there being no MsgA-preambles configured for the RedCap UE and there being the MsgA-PUSCH resources configured for the RedCap UE. Fora more detailed operation/description, Method 1-3 will be referenced.

And/or, the MsgB the MsgB may be scheduled based on downlink control information (DCI) with a CRC (cyclic redundancy check) scrambled by an MsgB-R (reduced)-RNTI (radio network temporary identifier). For a more detailed operation/description, Method 1-5 will be referenced.

For example, an operation in which the UE receives an MsgB in the step S1403 may be implemented by the above-described device of FIGS. 16 to 19. For example, referring to FIG. 17, one or more processor 102/202 may control one or more memories 104/204 and/or one or more transceivers 106/206 in order to receive an MsgB.

The operation of UE described with reference to FIG. 14 is identical to the operation (e.g., first embodiment and second embodiment) described with reference to FIGS. 1 to 13, so other detailed descriptions will be omitted.

The above-described signaling and operation may be implemented by a device (e.g., FIGS. 16 to 19) to be described below. For example, the above-described signaling and operation may be processed by one or more processors of FIGS. 16 to 19, and the above-described signaling and operation may be stored in a memory in the form of a command/program (e.g., instruction, executable code) for driving at least one process of FIGS. 16 to 19.

For example, a processing apparatus configured to control a UE so as to receive a messageB (MsgB) in a wireless communication system may include: at least one processor; and at least one memory operably connected to the at least one processor and storing instructions that, when executed by the at least one processor, perform operations. The operations may include: transmitting an MsgA-preamble to a base station; transmitting an MsgA-physical uplink shared channel (PUSCH) to the base station; and receiving the MsgB from the base station based on the MsgA-preamble and the MsgA-PUSCH, wherein the MsgA-preamble or the MsgA-PUSCH may indicate that the UE is a reduced capability (RedCap) UE.

As another example, in a computer-readable storage medium that, when executed by at least one processor, enables the at least one processor to control operations, and that stores at least one instruction, the operations may include: transmitting an MsgA-preamble to a base station; transmitting an MsgA-physical uplink shared channel (PUSCH) to the base station; and receiving the MsgB from the base station based on the MsgA-preamble and the MsgA-PUSCH, wherein the MsgA-preamble or the MsgA-PUSCH may indicate that the UE is a reduced capability (RedCap) UE.

FIG. 15 is a flowchart illustrating an operation method of a base station described in the present disclosure.

Referring to FIG. 15, firstly, a base station (100/200 of FIGS. 16 to 19) may receive an MsgA-preamble from a UE.

For example, an operation in which the base station receives an MsgA-preamble in the step S1501 may be implemented by the above-described device of FIGS. 16 to 19. For example, referring to FIG. 17, one or more processors 102/202 may control one or more memories 104/204 and/or one or more transceivers 106/206 in order to receive an MsgA-preamble.

And/or, the base station (100/200 of FIGS. 16 to 19) may receive a physical uplink shared channel (PUSCH) from the UE in the step S1502. And/or, resources of the MsgA-PUSCH may be determined based on the MsgA-preamble. In other words, MsgA-preambles may be mapped one on one to the resources of the MsgA-PUSCH, and the resources of the MsgA-PUSCH may be determined by the transmitted MsgA-preamble.

And/or, the redcap UE and the normal UE may share some of the entire MsgA-PUSCH resources, and unshared MsgA-PUSCH resources may be determined based on a mask index. For example, the mask index may be information representing or indicating shared MsgA-PUSCH resources or unshared MsgA-PUSCH resources. For example, the mask index may be a value corresponding to or indicating a bitmap representing shared MsgA-PUSCH resources or unshared MsgA-PUSCH resources.

For example, an operation in which the base station receives an MsgA-PUSCH in the step S1502 may be implemented by the above-described device of FIGS. 16 to 19. For example, referring to FIG. 17, one or more processor 102/202 may control one or more memories 104/204 and/or one or more transceivers 106/206 in order to receive an MsgA-PUSCH.

And/or, in the step S1403, the UE (100/200 of FIGS. 16 to 19) may receive an MsgB from the base station on the basis of the MsgA-preamble and the MsgA-PUSCH. For a more detailed operation/description for transmitting and receiving an MsgA (i.e., MsgA-preamble/MsgA-PUSCH) and an MsgB, what has been described of random access with reference to FIGS. 10 and 11 will be referenced.

Particularly, the MsgA-preamble or the MsgA-PUSCH may (explicitly or implicitly) indicate that the UE is a reduced capability (RedCap) UE. That is, the indication that the UE is a RedCap UE may be performed on the basis of the MsgA-preamble or the MsgA-PUSCH. For example, regarding an operation of indicating that the UE is a RedCap UE, the above-described redcap device type classification and the method of reporting to the base station will be referenced.

For example, N preambles among contention free random access (CFRA) preambles of the normal UE (e.g., a UE other than the RedCap UE), which are contiguous to a contention based random access (CBRA) preamble of the normal UE, may be allocated for the RedCap UE, based on there being no random access channel occasion (RO) configured for the RedCap UE. And/or, the MsgA-preamble may be one of the N preambles. And/or, information on the N may be configured based on higher layer signaling or system information.

And/or, preambles corresponding to an RO for a 2-step random access (RA) of the normal UE (e.g., a UE other than the RedCap UE) may be used for the RedCap UE, based on there being no random access channel occasion (RO) configured for the RedCap UE and there being the RO configured for the 2-step random access (RA) of the normal UE. And/or, the MsgA-preamble may be one of the preambles corresponding to the RO for the 2-step RA of the normal UE.

A more detailed operation/description or an operation/description for replacing or combining with the above operation(s) will be given with reference to Method 1-1-1.

And/or, the preambles corresponding to the RO of the normal UE (e.g., a UE other than the RedCap UE) may be used for the RedCap UE, based on there being a random access channel occasion (RO) configured for a 4-step random access (RA) of the RedCap UE and there being no RO configured for the 2-step RA of the RedCap UE. And/or, the MsgA-preamble may be one of the preambles corresponding to the RO of the normal UE.

A more detailed operation/description or an operation/description for replacing or combining with the above operation(s) will be given with reference to Method 1-1-2.

And/or, the MsgA-PUSCH may include information indicating that the UE is the RedCap UE. For a more detailed operation/description, Method 1-2-1 will be referenced. Also, in order to indicate that the UE is a RedCap UE based on MsgA-PUSCH, Method 1-2-2/Method 1-2-3/Method 1-2-4 may be applied, or Method 1-2-2/Method 1-2-3/Method 1-2-4 may be applied in combination with Method 1-2-1.

And/or, the UE may be indicated to be the RedCap UE by the MsgA-preamble, based on there being MsgA-preambles configured for the RedCap UE or based on there being the MsgA-preambles configured for the RedCap UE and MsgA-PUSCH resources configured for the RedCap UE, and the UE may be indicated to be the RedCap UE by the MsgA-PUSCH, based on there being no MsgA-preambles configured for the RedCap UE and there being the MsgA-PUSCH resources configured for the RedCap UE. Fora more detailed operation/description, Method 1-3 will be referenced.

And/or, the MsgB the MsgB may be scheduled based on downlink control information (DCI) with a CRC (cyclic redundancy check) scrambled by an MsgB-R (reduced)-RNTI (radio network temporary identifier). For a more detailed operation/description, Method 1-5 will be referenced.

For example, an operation in which the base station transmits an MsgB in the step S1503 may be implemented by the above-described device of FIGS. 16 to 19. For example, referring to FIG. 17, one or more processor 102/202 may control one or more memories 104/204 and/or one or more transceivers 106/206 in order to transmit an MsgB.

The operation of UE described with reference to FIG. 15 is identical to the operation (e.g., first embodiment and second embodiment) described with reference to FIGS. 1 to 14, so other detailed descriptions will be omitted.

The above-described signaling and operation may be implemented by a device (e.g., FIGS. 16 to 19) to be described below. For example, the above-described signaling and operation may be processed by one or more processors of FIGS. 16 to 19, and the above-described signaling and operation may be stored in a memory in the form of a command/program (e.g., instruction, executable code) for driving at least one process of FIGS. 16 to 19.

For example, a processing apparatus configured to control a base station so as to transmit a messageB (MsgB) in a wireless communication system may include: at least one processor; and at least one memory operably connected to the at least one processor and storing instructions that, when executed by the at least one processor, perform operations. The operations may include: receiving an MsgA-preamble from a UE; transmitting an MsgA-physical uplink shared channel (PUSCH) to the base station; and receiving the MsgB from the base station based on the MsgA-preamble and the MsgA-PUSCH, wherein the MsgA-preamble or the MsgA-PUSCH may indicate that the UE is a reduced capability (RedCap) UE.

As another example, in a computer-readable storage medium that, when executed by at least one processor, enables the at least one processor to control operations, and that stores at least one instruction, the operations may include: receiving an MsgA-preamble from a UE; receiving an MsgA-physical uplink shared channel (PUSCH) from the UE; and transmitting the MsgB to the UE based on the MsgA-preamble and the MsgA-PUSCH, wherein the MsgA-preamble or the MsgA-PUSCH may indicate that the UE is a reduced capability (RedCap) UE.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system (1) applied to the disclosure.

Referring to FIG. 16, a communication system applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (I) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. Relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 17 illustrates wireless devices applicable to the disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of a Wireless Device Applied to the Disclosure

FIG. 18 illustrates another example of a wireless device applied to the disclosure. The wireless device may be implemented in various forms according to a use-case/service.

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 17. For example, the transceiver(s) 114 may include the one or more transceivers 106 and 106 and/or the one or more antennas 108 and 108 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

FIG. 19 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 19, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 18, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 1010 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

In this case, a wireless communication technology implemented in the wireless device 100, 200 of the present disclosure may include Narrowband Internet of Things for low energy communication in addition to LTE, NR and 6G. In this case, for example, the NB-IoT technology may be an example of a Low Power Wide Area Network (LPWAN) technology, and may be implemented by standards, such as LTE Cat NB1 and/or LTE Cat NB2, and the present disclosure is not limited to the aforementioned names. Additionally or alternatively, a wireless communication technology implemented in a wireless device (100, 200) of the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least any one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/ or 7) LTE M, and the present disclosure is not limited to the aforementioned names. Additionally or alternatively, a wireless communication technology implemented in a wireless device (100, 200) of the present disclosure may include at least any one of ZigBee, Bluetooth and a Low Power Wide Area Network (LPWAN) in which low energy communication is considered, and the present disclosure is not limited to the aforementioned names. For example, the ZigBee technology may generate a personal area networks (PAN) related to small/low-power digital communication based on various standards, such as IEEE 802.15.4, and may be called various names.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving MsgB in the wireless communication system of the present disclosure has been described in connection with examples in which it applies to 3GPP LTE/LTE-A system and 5G systems (new RAT systems), the method is also applicable to other various wireless communication systems such as Beyond 5G, 6G, and Beyond 6G.

The invention claimed is:

1. A method of receiving a messageB (MSgB) in a wireless communication system, the method performed by a UE comprising:

transmitting a MsgA-preamble to a base station;

transmitting a MsgA-PUSCH to the base station; and receiving a MsgB from the base station, based on the MsgA-preamble and the MsgA-PUSCH, wherein the MsgA-preamble or the MsgA-PUSCH indicates that the UE is a reduced capability (RedCap) UE, wherein the receiving the MsgB comprises monitoring a physical downlink control channel (PDCCH) for downlink control information (DCI) with a cyclic redundancy check (CRC) scrambled by a MsgB-R (reduced)-RNTI (radio network temporary identifier), wherein the MsgB-R-RNTI is different from a MsgB-RNTI used for a normal UE to distinguish a MsgB scheduling DCI for the RedCap UE from a MsgB scheduling DCI for the normal UE, wherein the RedCap UE and the normal UE share a subset of MsgA-PUSCH resources, and MsgA-PUSCH resources not shared with the RedCap UE are determined based on a mask index.

2. The method of claim 1, wherein, based on no random access channel occasion (RO) for the RedCap UE being configured, N preambles among contention free random access (CFRA) preambles of the normal UE, which are contiguous to a contention based random access (CBRA) preamble of the normal UE, are allocated for the RedCap UE.

3. The method of claim 2, wherein the MsgA-preamble is one of the N preambles.

4. The method of claim 2, wherein information for the N is configured based on higher layer signaling or system information.

5. The method of claim 1, wherein, based on no random access channel occasion (RO) for the RedCap UE being configured and the RO for the 2-step random access (RA) of the normal UE being configured, preambles corresponding to an RO for a 2-step random access (RA) of the normal UE are used for the RedCap UE.

6. The method of claim 5, wherein the MsgA-preamble is one of the preambles corresponding to the RO for the 2-step RA of the normal UE.

7. The method of claim 1, wherein, based on a random access channel occasion (RO) for a 4-step random access (RA) of the RedCap UE being configured and no RO for the 2-step RA of the RedCap UE being configured, the preambles corresponding to the RO of the normal UE are used for the RedCap UE.

8. The method of claim 7, wherein the MsgA-preamble is one of the preambles corresponding to the RO of the normal UE.

9. The method of claim 1, wherein resources of the MsgA-PUSCH are determined based on the MsgA-preamble.

10. The method of claim 1, wherein the MsgA-PUSCH includes information indicating that the UE is the RedCap UE.

11. The method of claim 1, wherein the UE is indicated to be the RedCap UE by the MsgA-preamble, based on MsgA-preambles for the RedCap UE being configured or based on the MsgA-preambles for the RedCap UE being configured and MsgA-PUSCH resources for the RedCap UE being configured, and the UE is indicated to be the RedCap UE by the MsgA-PUSCH, based on no MsgA-preambles for the RedCap UE being configured and the MsgA-PUSCH resources for the RedCap UE being configured.

12. A UE configured to receive a messageB (MsgB) in a wireless communication system, the UE comprising:

at least one transceiver;

at least one processor; and at least one memory operably connected to the at least one processor and storing instructions that, based on being executed by the at least one processor, perform operations, the operations including:

transmitting a MsgA-preamble to a base station;

transmitting a MsgA-physical uplink shared channel (PUSCH) to the base station; and receiving the MsgB from the base station based on the MsgA-preamble and the MsgA-PUSCH, wherein the MsgA-preamble or the MsgA-PUSCH indicates that the UE is a reduced capability (RedCap) UE, wherein the receiving the MsgB comprises monitoring a physical downlink control channel (PDCCH) for downlink control information (DCI) with a cyclic redundancy check (CRC) scrambled by a MsgB-R (reduced)-RNTI (radio network temporary identifier), wherein the MsgB-R-RNTI is different from a MsgB-RNTI used for a normal UE to distinguish a MsgB scheduling DCI for the RedCap UE from a MsgB scheduling DCI for the normal UE, wherein the RedCap UE and the normal UE share a subset of MsgA-PUSCH resources, and MsgA-PUSCH resources not shared with the RedCap UE are determined based on a mask index.

13. The UE of claim 12, wherein, based on no random access channel occasion (RO) for the RedCap UE being configured, N preambles among contention free random access (CFRA) preambles of the normal UE, which are contiguous to a contention based random access (CBRA) preamble of the normal UE, are allocated for the RedCap UE.

14. The UE of claim 13, wherein the MsgA-preamble is one of the N preambles.

15. A method of transmitting a messageB (MsgB) in a wireless communication system, the method performed by a base station comprising:

receiving a MsgA-preamble from a UE;

receiving a MsgA-physical uplink shared channel (PUSCH) from the UE; and transmitting the MsgB to the UE based on the MsgA-preamble and the MsgA-PUSCH, wherein the MsgA-preamble or the MsgA-PUSCH indicates that the UE is a reduced capability (RedCap) UE, wherein the transmitting the MsgB comprises transmitting a physical downlink control channel (PDCCH) for downlink control information (DCI) with a cyclic redundancy check (CRC) scrambled by a MsgB-R (reduced)-RNTI (radio network temporary identifier), wherein the MsgB-R-RNTI is different from a MsgB-RNTI used for a normal UE to distinguish a MsgB scheduling DCI for the RedCap UE from a MsgB scheduling DCI for the normal UE, wherein the RedCap UE and the normal UE share a subset of MsgA-PUSCH resources, and MsgA-PUSCH resources not shared with the RedCap UE are determined based on a mask index.

* * * * *